United States Patent
Nozaki et al.

(10) Patent No.: US 7,308,358 B2
(45) Date of Patent: Dec. 11, 2007

(54) NAVIGATOR, NAVIGATION SYSTEM, NAVIGATION METHOD, DATA PROCESSING APPARATUS, DATA PROCESSING METHOD, PROGRAM THEREOF, AND RECORDING MEDIUM THEREOF

(75) Inventors: Takashi Nozaki, Tokyo (JP); Kouji Amano, Tokyo (JP)

(73) Assignee: Increment P Corporation, Tokyo (JP)

( * ) Notice: Subject to any disclaimer, the term of this patent is extended or adjusted under 35 U.S.C. 154(b) by 0 days.

(21) Appl. No.: 10/382,998

(22) Filed: Mar. 7, 2003

(65) Prior Publication Data
US 2003/0182056 A1   Sep. 25, 2003

(30) Foreign Application Priority Data
Mar. 7, 2002 (JP) ............................. 2002-062614
Mar. 7, 2002 (JP) ............................. 2002-062615

(51) Int. Cl.
*G08G 1/123* (2006.01)
*G01C 21/36* (2006.01)
*G01C 21/34* (2006.01)

(52) U.S. Cl. ............ 701/209; 340/995.14; 340/995.24; 340/995.27; 701/211

(58) Field of Classification Search ........... 340/995.14, 340/995.24, 995.27, 995.19; 715/700, 764; 345/619; 701/209, 211
See application file for complete search history.

(56) References Cited

U.S. PATENT DOCUMENTS

| | | | |
|---|---|---|---|
| 6,064,941 A * | 5/2000 | Nimura et al. ............... 701/210 |
| 6,188,403 B1 * | 2/2001 | Sacerdoti et al. ............ 715/764 |
| 6,330,858 B1 * | 12/2001 | McDonough et al. ....... 101/208 |
| 6,343,290 B1 * | 1/2002 | Cossins et al. ............... 707/10 |
| 6,526,335 B1 * | 2/2003 | Treyz et al. .................. 701/1 |
| 6,587,787 B1 * | 7/2003 | Yokota ........................ 701/212 |
| 2001/0027444 A1 * | 10/2001 | Mitsuhashi .................. 705/64 |

(Continued)

FOREIGN PATENT DOCUMENTS

JP     5-20016     1/1993

(Continued)

OTHER PUBLICATIONS

European Search Report of Nov. 1, 2004.

(Continued)

*Primary Examiner*—Thomas Black
*Assistant Examiner*—Christine M Behncke
(74) *Attorney, Agent, or Firm*—Kratz, Quintos & Hanson, LLP

(57) ABSTRACT

A system member of a data processing system 1 operates a terminal 3 to connect a registration-site server 6, and inputs requirements including personal data. The registration-site server 6 creates customer data from the requirements and point data concerning points given, and registers the system member as a point member. The system member clicks an icon of "Side trip" on a point card registration-site at the terminal 3, to transfer the point data and shop code data from the registration-site server 6 to a server 5, so that shop data is automatically made. The terminal 3 is operated to connect the sever 5. Upon a request for shop search, the position of the shop for which the point member is registered is displayed with higher visibility corresponding to use frequency than other shops.

13 Claims, 30 Drawing Sheets

U.S. PATENT DOCUMENTS

| | | | |
|---|---|---|---|
| 2002/0011235 A1* | 1/2002 | Kamoto | 123/339.22 |
| 2002/0077910 A1* | 6/2002 | Shioda et al. | 705/14 |
| 2002/0165009 A1* | 11/2002 | Nohara et al. | 455/558 |
| 2003/0045998 A1* | 3/2003 | Medl | 701/207 |
| 2003/0065595 A1* | 4/2003 | Anglum | 705/35 |
| 2003/0201914 A1* | 10/2003 | Fujiwara et al. | 340/995.24 |

FOREIGN PATENT DOCUMENTS

| | | |
|---|---|---|
| JP | 8-161261 | 6/1996 |
| JP | 9-185323 | 7/1997 |
| JP | 9-292262 | 11/1997 |
| JP | 11-160088 | 6/1999 |
| JP | 11160088 A * | 6/1999 |
| JP | 2001-195491 A | 7/2001 |
| JP | 2001-229459 | 8/2001 |
| JP | 2001-333455 | 11/2001 |
| JP | 2002-7589 A | 1/2002 |
| JP | 2002-14992 | 1/2002 |
| JP | 2002-15215 | 1/2002 |
| JP | 2002-62157 | 2/2002 |
| JP | 2002-92739 | 3/2002 |

OTHER PUBLICATIONS

Office Action of JP 2002-062614 and JP 2002-062615 dated Feb. 27, 2007—Notification of Reason(s) for Refusal with English translation.

Office Action for JP 2002-062614 on Jun. 5, 2007 with English translation.

* cited by examiner

FIG. 6

| PERSONAL LIST TABLE | | | | | |
|---|---|---|---|---|---|
| USER ID | NAME | ADDRESS | E-MAIL ADDRESS | ..... | SYSTEM POINT |
| 00001 | OO OO | SETAGAYA-KU, TOKYO··· | 00000@000.CO.JP | ..... | 100 |
| 00002 | x x  x x | YOKOHAMA-SHI, KANAGAWA··· | 00000@000.CO.JP | ..... | 250 |

FIG. 7

| GROUP LIST TABLE | | | | | | |
|---|---|---|---|---|---|---|
| GROUP ID | PASSWORD | GROUP NAME | CREATOR(ID) | MEMBER ID | TIME | DATE |
| G0001 | BC5EJ20G | EXCESSIVE EATER | 00001 | 00356 | 09:32 | 20011221 |
| G0001 | BC5EJ20G | EXCESSIVE EATER | 00001 | 00357 | 09:32 | 20011221 |
| G0002 | BC8EJ20R | SANTA HUNTER | 00002 | 00089 | 18:30 | 20011225 |

FIG. 8

| SHOP TABLE | | | | | | |
|---|---|---|---|---|---|---|
| SHOP CODE | USER ID | GENRE CODE | LATITUDE | LONGITUDE | POINT SCORE | OPEN GROUP ID |
| mise2055135 | 00001 | 123 | 139.41.21.80 | 35.38.0.30 | 20 | G0001 |
| mise206677 | 00002 | 124 | 139.42.44.80 | 35.37.48.20 | 15 | G0001 |

FIG.15

RESTAURANT ○○○ IS REGISTERED.

SELECT A GROUP
TO OPEN RESTAURANT ○○○.

☐ PERSONAL (NOT SHOWN)

■ TECHNICAL MANAGEMENT CLUB

☐ QUALITY GUARANTEE CLUB

64

- DISPLAY IN MAP MODE
- DISPLAY IN LIST MODE
- DISPLAY IN MAP-LIST MIXED MODE

FIG.21

| SHOP | POINT SCORE | CONVERSION | MAP FAN POINT |
|---|---|---|---|
| RESTAURANT ○○ | 120point | ⇒ | 300point |
| ELECTRIC SHOP ○○ | 80point | | 250point |
| CAMERA SHOP ○○ | 200point | | 200point |
| RECORD SHOP ○○ | 60point | | 120point |
| BAG SHOP ○○ | 2000point | | 100point |

FIG.22

| | SHOP | POINT SCORE | DISTANCE FROM CURRENT POSITION |
|---|---|---|---|
| 1 | CAMERA SHOP ○○ | 250 | 1km |
| 2 | PC PALACE ○○ | 100 | 500m |
| 3 | ELECTRIC SHOP ○○ | 80 | 1.2km |
| 4 | RESTAURANT ○○ | | 2.3km |
| 5 | BARBECUE ○○ | | 800m |
| 6 | PHOTOGRAPH SHOP ○○ | | 1.0km |
| 7 | PUB ○○ | | 2.2km |
| 8 | SMALL RESTAURANT ○△ | | 600m |
| 9 | STATION HOTEL ○○ | | 5.4km |
| 10 | CLINIC ○ | | 3.8km |

FIG.23

| | SHOP | POINT | DISTANCE FROM CURRENT POSITION |
|---|---|---|---|
| 1 | CAMERA SHOP ○○ | 250 | 1km |
| 2 | PC PALACE ○○ | 100 | 500m |
| 3 | ELECTRIC SHOP ○○ | 80 | 1.2km |
| 4 | PHOTOGRAPH SHOP ○○ | | 1.0km |
| 5 | ELECTRIC SHOP □□ | | 800m |
| 6 | ELECTRIC SHOP ×○ | | 5.5km |
| 7 | BIKKURI CAMERA ○○ BRANCH | | 2.2km |
| 8 | HOME-ELECTRONICS MARKET ○□ | | 600m |
| 9 | OA EQUIPMENT SHOP ○○ | | 5.4km |
| 10 | HOME-ELECTRONICS ○△ | | 3.8km |

FIG.24

| PARTICIPATION GROUP NAME | OPENED SHOP (LOCATION) |
|---|---|
| TECHNICAL MANAGEMENT CLUB | RESTAURANT RABBIT |
| TECHNICAL MANAGEMENT CLUB | RABBIT PARK |
| QUALITY GUARANTEE CLUB | SHUSHI IWA |

FIG.25

| | SHOP | POINT | DISTANCE FROM CURRENT POSITION |
|---|---|---|---|
| 1 | CAMERA SHOP ○○ | 250 | 1km |
| 2 | PC PALACE ○○ | 100 | 0.5km |
| 3 | RESTAURANT RABBIT | 80 | 1.5km |
| 4 | RESTAURANT RABBIT (TECHNICAL MANAGEMENT CLUB) | | 1.5km |
| 5 | RABBIT PARK (TECHNICAL MANAGEMENT CLUB) | | 4.1km |
| 6 | SUSHI IWA (QUALITY GUARANTEE CLUB) | | 1.8km |
| 7 | RESTAURANT ○○ | | 2.3km |
| 8 | BARBECUE ○ | | 0.8km |
| 9 | PHOTOGRAPH SHOP ○○ | | 1.0km |
| 10 | PUB ○○ | | 2.2km |

FIG.26

| | SHOP | POINT | DISTANCE FROM CURRENT POSITION |
|---|---|---|---|
| 1 | ○○ BURGERS | | 800m |
| 2 | PC PALACE ○○ | 100 | 500m |
| 3 | RESTAURANT □□ | | 3km |
| 4 | ELECTRIC SHOP □□ | 80 | 1.2km |
| 5 | CAMERA SHOP ○○ | 250 | 1km |
| 6 | ELECTRIC SHOP □□ | | 1.0km |
| 7 | PUB ○○ | | 2.2km |
| 8 | SMALL RESTAURANT ○△ | | 600m |
| 9 | STATION HOTEL ○○ | | 5.4km |
| 10 | CLINIC ○ | | 3.8km |

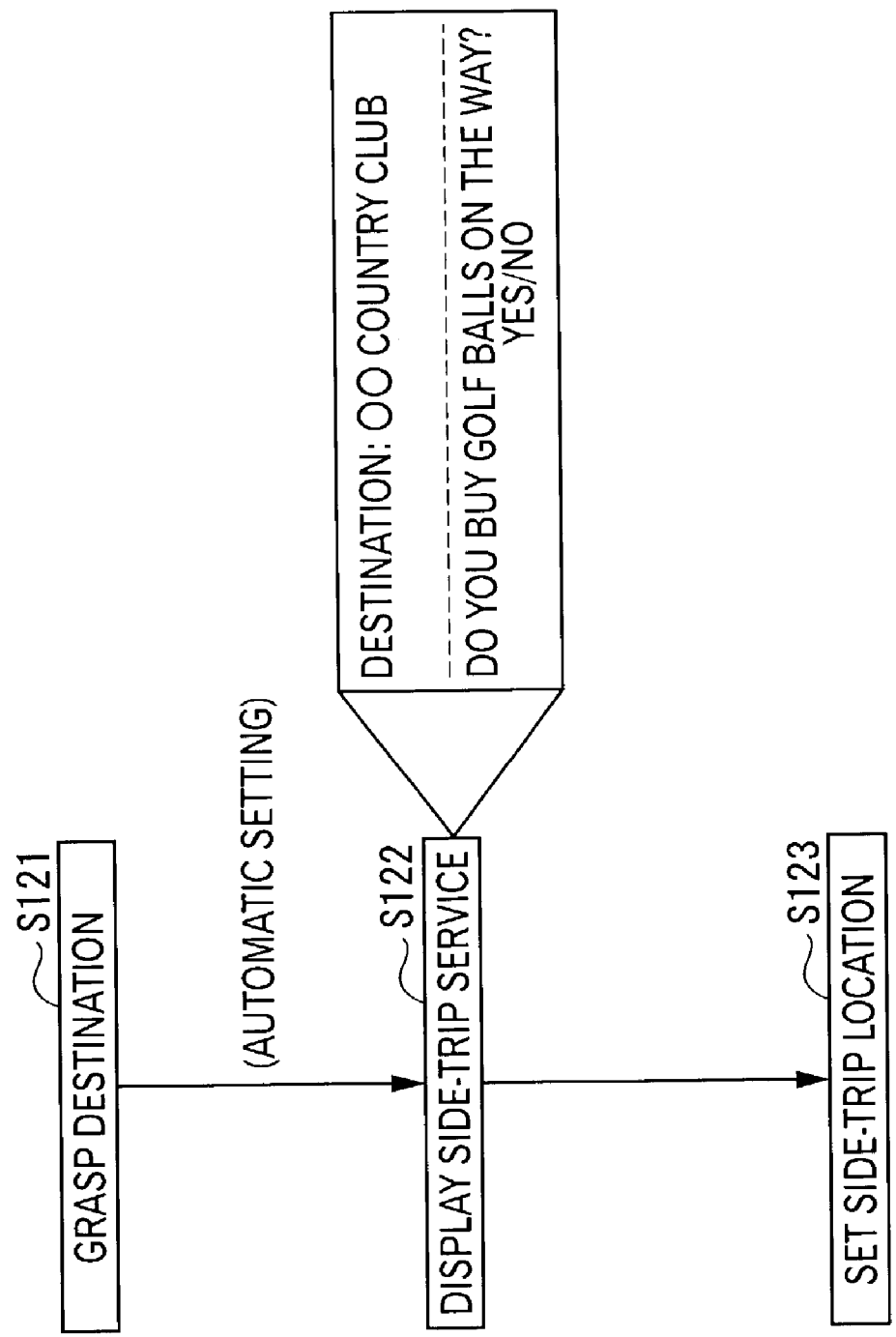

FIG.29
| SHOP NAME | POINT SCORE | SYSTEM POINT |
|---|---|---|
| RESTAURANT ○○ | 120point | 300point |
| ELECTRIC SHOP ○○ | 80point | 250point |
| CAMERA SHOP ○○ | 200point | 200point |
FIG.30A
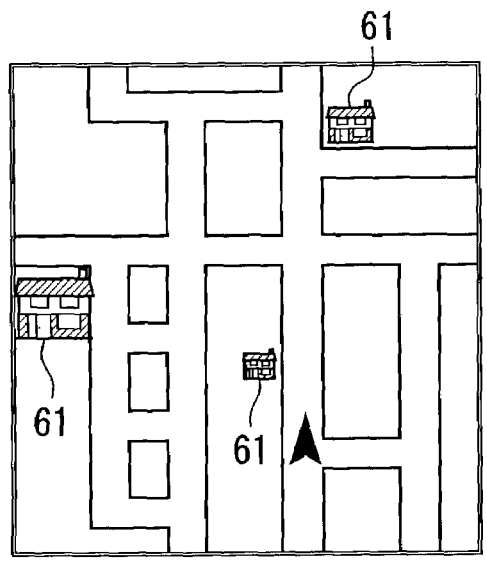
FIG.30B
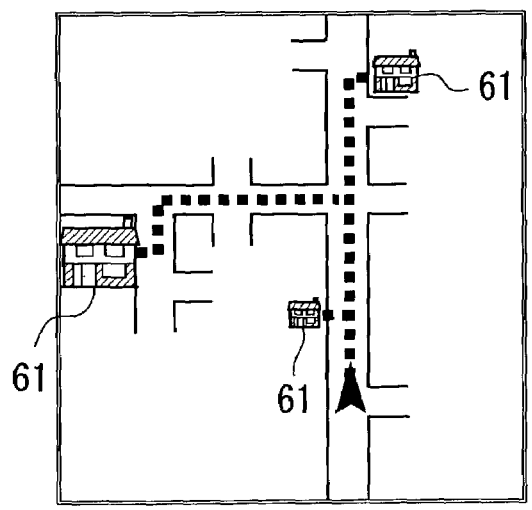

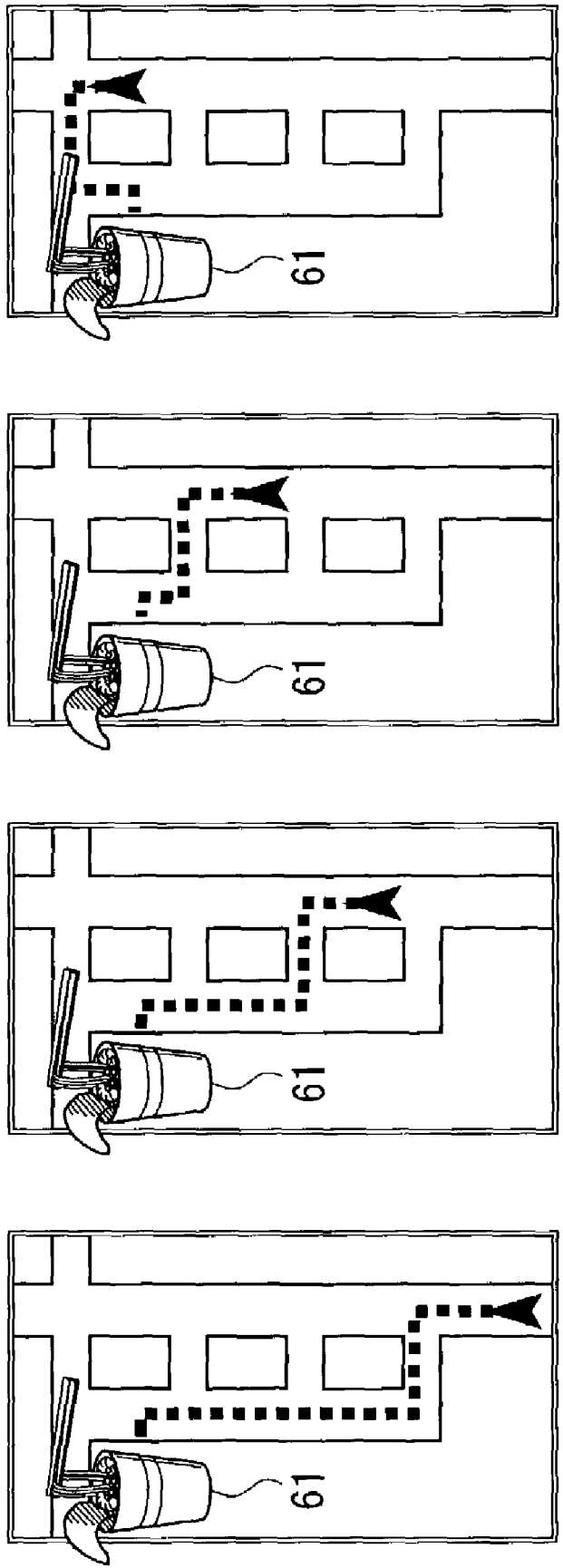

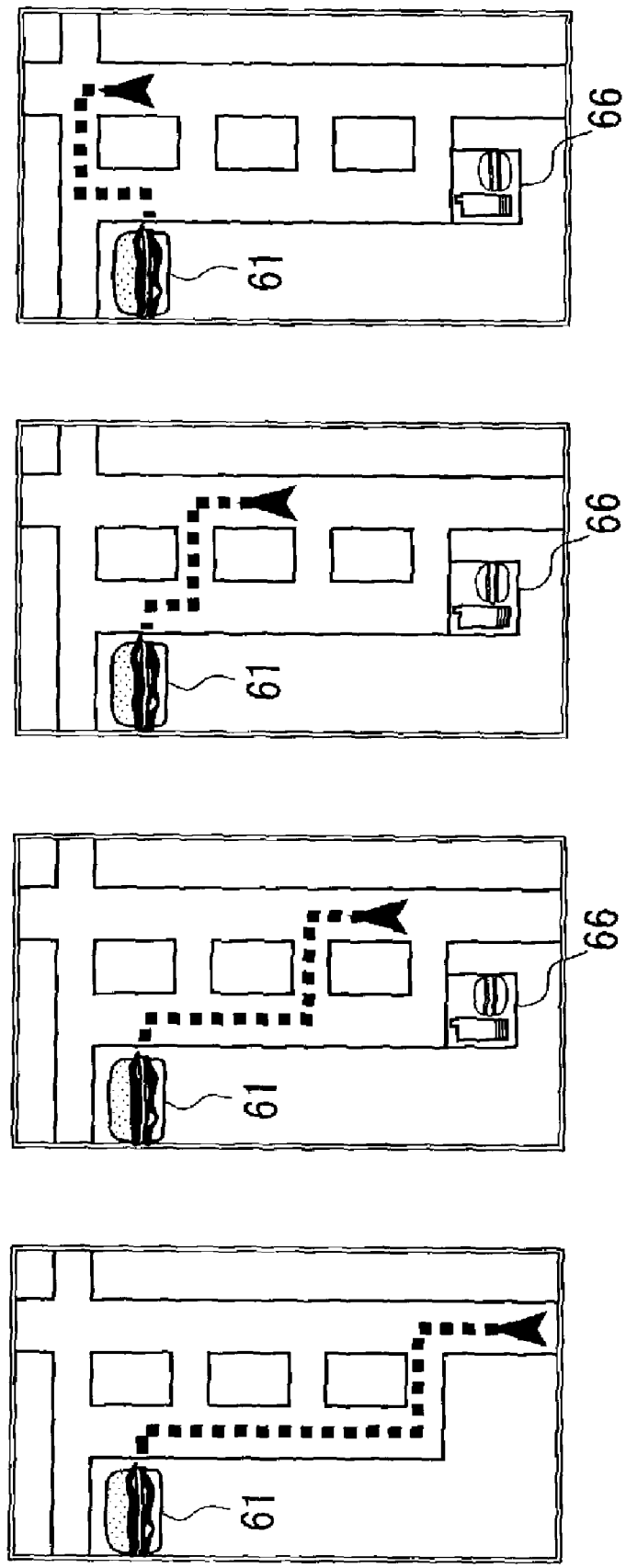

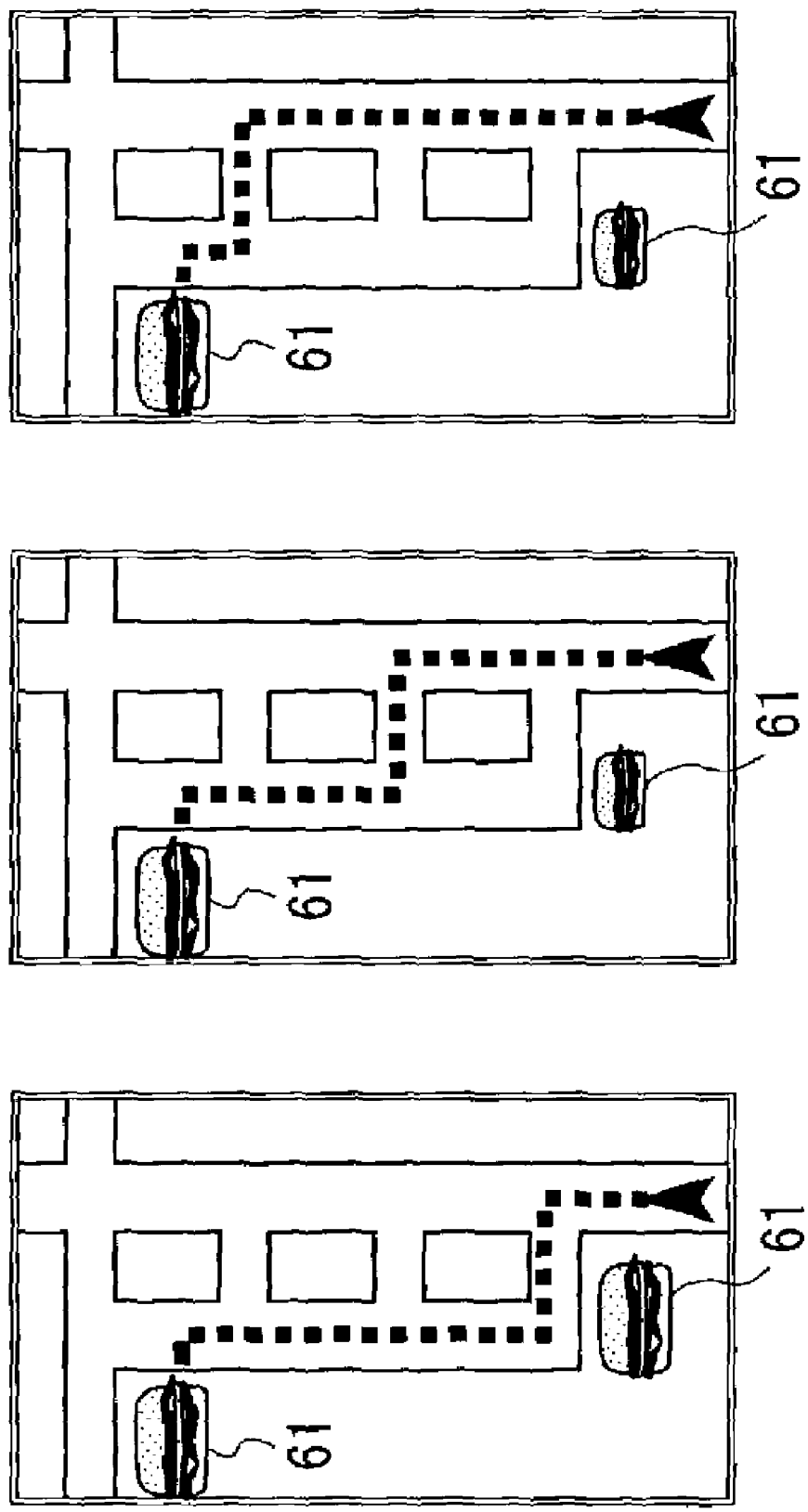

NAVIGATOR, NAVIGATION SYSTEM, NAVIGATION METHOD, DATA PROCESSING APPARATUS, DATA PROCESSING METHOD, PROGRAM THEREOF, AND RECORDING MEDIUM THEREOF

BACKGROUND OF THE INVENTION

1. Field of the Invention

The present invention relates to a guide apparatus, guide system, guide method, data processing apparatus, data processing method, program thereof, and recording medium thereof, which create customer data including point data concerning points given to users from shops and set each user as a point member.

2. Description of the Related Art

Wide spreading of conventional computers allow various data to be attained from homepages at various sites in WWW (World Wide Web) servers via Internet. Companies insert their advertisements in parts of homepages at predetermined advertisement fees.

There are frequently used homepages, i.e., frequently accessed homepages which are read by a number of users and give very high advertisement effectiveness. However, a number of advertisement indications are inserted in these homepages, so the advertisement effectiveness deteriorates. In addition, frequently accessed homepages raise advertisement fees for permitting display of advertisements because areas to be occupied by advertisements are limited. It is therefore vague whether a user who has watched a displayed advertisement will use actually the advertised company or not. Difficulties thus lie in efficiently achieving advertisement effectiveness. Alternatively, a mere advertisement may make users of a homepage feel troublesome.

When users search desired shops, shops are searched based on shop names in some known methods. It is however difficult to find out efficiently shops desired from various users. That is, efficient advertisement effectiveness cannot be easily achieved by conventional systems for displaying advertisements. In conventional methods for searching shops, users cannot efficiently find out desired shops.

Meanwhile, there is a known point system as follows. When a user uses a shop, some points are given to the user depending on contents of the use. Once points are stocked to some extent, various services can be offered to the user depending on the points. In this point system, each user enters requirements including personal data such as a full name or an address into a registration sheet at a shop, for example. Based on the entered requirements, a point card is issued on the spot or mailed later mail from the shop to each user as a point member. The shop inputs the requirements from an input terminal to let a database memorize customer data and data about the score of points given on the basis of use of the shop, together in one record for each user.

However, the service of inputting the requirements written on registration sheets must be carried out in the intervals between ordinary business services. Preparation and maintenance of customer data are therefore complicated. In recent years, a system has become known in which each user inputs those requirements at a point-card registration-site for registration on the WWW, to reduce the labor of inputting services at shops.

In this system of using a point-card registration-site, a user ID (identification) and a URL (Universal Resource Locator) of a WWW site for point-card registration are printed on a card distributed to each user from a shop. Based on these printed items, each user connects to the point-card registration-site through a personal computer or mobile phone, and enters requirements. Then, the requirements are stored as customer data in a database in a WWW server of the shop, to complete registration of each user. Point cards are mailed to users later.

In most cases, every user has memberships as point members belonging to plural shops. Each user therefore does not always grasp the shops whose memberships of point members the user has. In some cases, a user makes a double registration to a point card of one same shop although the user has once registered a point card of the same shop. Each user may thus often have plural point cards of one same shop. Suppose particularly a case that a user registers a point card at a spot far from the user's residence, place of employment, or school, e.g., a user registers a point card of a gas station or souvenir shop. In this case, the user rarely remembers that he or she has become the point member at the spot when the user passes or uses the spot.

Thus, the data quantity may increase undesirably due to multiple point-card registrations from one same person, complicating customer management at each shop. It is also difficult to manage shop data concerning shops to which a user belongs as point members. In addition, a poor achievement appears in advertisement effectiveness that a user wants to use one shop repeatedly because the user is a point member of the shop. Consequently, no progress may be expected in business results of shops, equivalent to the labor of data management.

SUMMARY OF THE INVENTION

An object of the present invention is to provide a navigator capable of attaining great advertisement effectiveness and navigating a customer to a shop satisfactorily, a system thereof, a method thereof, a program thereof, and a recording medium which records the program.

A navigator according to the present invention navigates a user to a shop, comprising: a use data attaining portion which attains use data concerning use frequency at which the user used the shop; a shop data attaining portion which attains shop data specific to the shop, the shop data including position data specifying the position of the shop; a shop search portion which searches for the shop existing within a predetermined area, based on the position data of the shop data attained by the shop data attaining portion; and a display controller which outputs a signal for making the shop searched for by the shop search portion, be displayed in a display mode in which visibility is differentiated in correspondence with the use frequency, based on the use data attained by the use data attaining portion.

In this configuration, a shop existing within a predetermined area is searched for by the shop search portion, based on the position data which specifies the position of a shop in the shop data which is attained by the shop data attaining portion. The display controller outputs a signal which makes, for example, a display of a terminal display the searched shop in a display mode in which visibility is differentiated in correspondence with the use frequency, based on use data concerning use frequency of the shop used by the user, the use data attained by the use data attaining portion. As a result of this, a desired shop can be satisfactorily searched for in correspondence with the use frequency of the user, so the searched shop can be used by the user at a higher rate. Accordingly, the shop can attain great advertisement effectiveness, and the user can be navigated excellently to the searched shop. Due to increase in advertisement effectiveness, steadier increase in use frequency of the user can be expected in comparison with the conventional case of simply presenting advertisements on sites. Accordingly, cost effectiveness in advertisement performance increases so that use can be enhanced.

Preferably, in the navigator according to the present invention, the use data attaining portion attains point data concerning points given to the user from the shop, as the use data concerning the use frequency of the shop.

In this configuration, the use data attaining portion attains point data concerning points given to the user from the shop, as the use data concerning the use frequency of the shop. As a result, point management can be easily achieved by the user, and shops can be searched for by a simple configuration, e.g., depending on sizes of points. Accordingly, the processing efficiency can be improved.

Preferably, the navigator according to the present invention further comprises: a setting input recognition portion which recognizes an input operation for selection of a shop from a user; and a shop data processing portion which links selection data expressing the selection from the user, to shop data of the shop recognized through the input operation by the setting input recognition portion, wherein the display controller outputs a signal for making the shop be displayed with visibility which is differentiated based on selection data of the shop data.

In this configuration, the selection data expressing the selection made by the user of the input operation recognized by the setting input recognition portion is linked with shop data. The display controller outputs a signal for making the shop be displayed with visibility which is differentiated based on the selection data of the shop data. As a result, the display mode of the shop is set by a private selection of the user. Accordingly, the ability to handle the shop data is improved for the user, so that conveniences for the user in searching for the shop are increased, and applicability of shop search results to general purposes is also improved.

Preferably, the navigator according to the present invention further comprises a map data storage which stores map data, wherein the display controller outputs a signal for making the shop be displayed on the map data.

In this configuration, the display controller outputs a signal for making the shop be displayed on the map data stored in the map data storage. As a result, the searched shop can be confirmed on the map, so that the position of the shop can be recognized easily. Accordingly, conveniences are increased.

Preferably, the navigator according to the present invention further comprises: a current position data attaining portion which attains current position data concerning a current position; and a moving route search portion which searches for an estimated route from the current position to the searched shop, based on the map data stored in the map data storage, and estimated from the current-position data attained by the current-position data attaining portion and the shop data of the searched shop searched for by the shop search portion, wherein the display controller outputs a signal for making the estimated route searched for by the moving route search portion be displayed with higher visibility than other data of the map data.

In this configuration, the moving route search portion searches for an estimated route from the current position to the searched shop, based on the map data, and estimated from the current-position data attained by the current-position data attaining portion and the shop data of the searched shop searched for by the shop search portion. The display controller outputs a signal for making the estimated route be displayed with higher visibility than other data of the map data. As a result, the estimated route to the searched shop can be displayed with higher visibility, so that ability to navigate the user to the shop is improved. Accordingly, great advertisement effectiveness can be attained.

Preferably, in the navigator according to the present invention, the display controller outputs a signal for making the shop be displayed in form of a list.

In this configuration, the display controller outputs a signal for making a searched shop be displayed in form of a list. As a result, it is easy to compare the searched shops even if there are many. Accordingly, conveniences are increased.

Preferably, the navigator according to the present invention further comprises a displayable shop number setting portion which sets the number of shops to be displayed by the display controller, to a predetermined number.

In this configuration, the displayable shop number setting portion sets the number of shops to be displayed by the display controller, to a predetermined number. As a result, even when a large number of shops are searched for, it is prevented that it becomes hard to see the search results. Position check on a map in the map mode and comparison and evaluation in the list mode cannot be hindered. Accordingly, excellent shop search results can be attained.

Preferably, in the navigator according to the present invention, the display controller outputs a signal for making the shops to be displayed be displayed at random if the number of shops to be displayed is greater than the predetermined number set by the displayable shop number setting portion.

In this configuration, the display controller outputs a signal for making the shops to be displayed be displayed at random if the number of shops to be displayed is greater than the predetermined number set by the displayable shop number setting portion. As a result, it is possible to prevent a situation that no shops are displayed even though the number of shops to be searched for is limited and a search is carried out for every search. Accordingly, opportunities to allow the user to know new shops can be increased, so the advertisement effectiveness can be ensured.

Preferably, in the navigator according to the present invention, the shop data attaining portion attains shop data including type data of the shop, and the display controller outputs a signal for making shops searched for by the shop search portion be displayed for every type, based on the type data of the shop data.

In this configuration, the display controller outputs a signal for making shops searched for by the shop search portion be displayed for every type, based on the type data of the shop data attained by the shop data attaining portion. As a result, the search for a shop desired from the user can be facilitated more, so that conveniences in use can be increased.

A navigation system according to the present invention comprises: the navigator described above; and a terminal having a display unit connected to the navigator, being capable of receiving at least the signal outputted from the display controller of the navigator, to display shops in a display mode in which visibility is differentiated in correspondence with use frequencies of the shops, based on the signal from the display controller.

In this configuration, the navigator according to claim 19 which can attain great advertisement effectiveness for shops, navigate excellently a user to a searched shop, and lead to enhanced use is connected to a terminal having a display unit which displays shops in a display mode in which visibility is differentiated in correspondence with use frequencies of the shops, based on the signal from the display controller. As a result, results of shop searches can be easily attained by using a network, so that conveniences in use are increased and use can be enhanced easily.

A navigation method according to the present invention develops and applies the foregoing navigator according to the invention to a navigation method, which uses a computer to navigate a user to a shop, and comprises steps of: attaining use data concerning a use frequency at which the user used the shop, and attaining shop data specific to the shop, the shop data including position data specifying the position of the shop; searching for the shop existing within a predetermined area, based on the position data of the attained shop data; and making the shop searched for be displayed in a display mode in which visibility is differentiated in correspondence with the use frequency, based on the attained use data.

As a result, the same operations and advantages as achieved by the navigator of the invention can be achieved.

A navigation program according to the present invention makes a computer execute the foregoing navigation method according to the present invention.

In this configuration, for example, the navigation program can be installed into a general purpose computer, so that the navigation method according to the present invention can be executed by the computer. As a result, use and application of the present invention can be promoted greatly.

A recording medium according to the present invention records the navigation program according to the present invention to be readable for a computer.

In this configuration, the navigation program which makes the computer execute the navigation method according to the present invention is recorded on a recording medium. Therefore, handling of the navigation program is easy, so that use and application of the present invention can be promoted greatly.

The computer described herein is not limited to one single computer. For example, the configuration may include plural computers combined with each other like a network, an element such as a microcomputer, a circuit board mounting plural electronic components, and the like.

Another object of the present invention is to provide a data processing apparatus, data processing method, data processing program, and recording medium with the program recorded thereon, which facilitate management of the data concerning points given from shops.

A data processing apparatus according to the present invention creates customer data by linking point data concerning points given to a user from a shop, with personal data specific to the user, and sets the user to be a point member, the apparatus comprising: a setting input recognition portion which recognizes an input operation from the user; a shop data attaining portion which attains, as shop data, the point data of the created customer data and shop identification data linked to each other by recognizing an input operation from the user by the setting input recognition portion, the shop identification data including position data indicating the position of the shop and identifying the shop; a map data storage which stores map data; and a shop position specify portion which specifies the position of the shop, based on the position data of the shop and the map data stored in the map data storage.

In this configuration, when an input operation from a user is recognized by the setting input recognition portion, the point data concerning points given from a shop to the user and the shop identification data having position data indicating the position of the shop and identifying the shop are linked with each other and attained as shop data by the shop data attaining portion. The shop position specify portion specifies the position of the shop, based on the shop position data and map data stored in the map data database. As a result, where the shops for each of which the user is a point member is and how many points the user has can be recognized easily by using customer data of the user who has become a point member at each of the shops or a point card registration-site through a point card registration procedure. Thus, shop data of the shops for each of which the user is a point member can be easily managed. Additionally, overlapped registrations of each user can be prevented. As a result, customer data can be easily managed at the shops, and the advertisement effectiveness is increased. Improvements can hence be expected in business results. Further, due to increase in advertisement effectiveness, steadier increase in use frequency of the user can be expected in comparison with the conventional case of simply presenting advertisements on sites. Accordingly, cost effectiveness in advertisement performance increases so that use can be enhanced.

Preferably, the data processing apparatus according to the present invention further comprises a point member setting portion including: a personal data attaining portion which attains personal data specific to the user; a customer data creation portion which creates the customer data by linking the personal data attained by the personal data attaining portion, with the point data; and a setting input recognition portion, wherein an input operation from the user is recognized by the setting input recognition portion, and the point member setting portion accordingly outputs the point data and shop identification data to the shop data attaining portion.

In this configuration, the customer data creation portion creates the customer data by linking the personal data specific to a user and attained by the personal data attaining portion, with the point data. When the setting input recognition portion recognizes an input operation from the user, the point member setting portion outputs the point data and shop identification data to the shop data attaining portion. As a result, as the user makes a predetermined input operation together with an input operation for point card registration, shop data is automatically created. Accordingly, it is possible to facilitate creation and management of shop data for facilitating management of shops and points given from the shops.

Preferably, the data processing apparatus according to the present invention further comprises: a shop data management portion including shop data attaining portion, map data storage, and shop position specify portion; and a network which connects the shop data management portion to the point member setting portion, making transmission/reception possible between both of the portion.

In this configuration, the shop data management portion including the shop data attaining portion, map data storage, and shop position specify portion are connected to the point member setting portion via the network, making transmission/reception possible between both of the portion. As a result, shops handle customer data processed by the point member setting portion, independently from users. Users can deal with the shop data processed by the shop data management portion, also independently from shops. Accordingly, data processing respectively corresponding to different purposes and different handlings can be easily attained, and rapid handling of data based on construction of the network is easy. Use can thus be enhanced.

Preferably, in the data processing apparatus according to the present invention, the personal data attaining portion includes input setting portion which invites input of personal data to be attained, and the setting input recognition portion includes an operator which is provided in the input setting portion and invites the user to make an input operation.

In this configuration, point card registration is executed as a user inputs personal data by the input setting portion which is provided in the personal data attaining portion and invites input of personal data. An input operation from the user for creating shop data is recognized by the operator of the setting input recognition portion, which is provided in the input setting portion and invites the user to make an input operation. As a result, for example, even when a point card registration-site is used to omit an input operation from a shop, point data and shop identification data are outputted from the point card registration-site, and shop data can be created automatically, by only providing the operator in the point card registration-site. It is accordingly possible for the simple configuration to achieve easily data management by users and shops and increase in advertisement effectiveness.

Preferably, the data processing apparatus according to the present invention further comprises: a disclosure request recognition portion which recognizes a shop data disclosure request based on an input operation from the user, wherein the shop data disclosure request is recognized by the disclosure request recognition portion, and the shop position specify portion accordingly outputs, to the user, shop data concerning the shop specified on the basis of the position data of the shop and the map data stored in the map data storage.

In this configuration, the shop position specify portion recognizes the shop data disclosure request by the disclosure request recognition portion, and outputs, to the user, shop data concerning the shop specified on the basis of the position data of the shop and the map data stored in the map data storage. As a result, the position of a shop can be specified from the position data of the shop, for example, by an input operation from a user. Points with respect to the shop can be recognized from the point data of shop data. Accordingly, the user can easily recognize data concerning the shop by a predetermined input operation. Thus, effective use of shop data can be achieved, and advertisement effectiveness can be easily increased.

Preferably, the data processing apparatus according to the present invention further comprises a point conversion portion which converts points given from each of shops into common unit rates.

In this configuration, the point conversion portion converts points given from each of shops into common unit rates. As a result, even when there are plural shops for each of which the user is a point member, points can be converted into common unit rates, so points can be easily compared between the shops. Accordingly, recognition and management of data concerning shops can be easily achieved.

Preferably, the data processing apparatus according to the present invention further comprises: a shop use recognition portion which recognizes use of a shop by a user; and a navigation fee charge portion which outputs a guide which invites the shop to pay a handling fee, as the shop use recognition portion recognizes that the user has used the shop.

In this configuration, the navigation fee charge portion outputs a guide which invites the shop to pay a handling fee, as the shop use recognition portion recognizes that the user has used the shop. As a result, management of shop data is easy for the user, and great advertisement effectiveness can be attained. Accordingly, a procedure of charging a handling fee for advertisement performance used by the user can be automatically carried out, as the user uses the shop. Management is thus facilitated.

The data processing apparatus according to the present invention further comprises a navigator which navigates the user to a shop for which the user is set as a point member.

In this configuration, the navigator navigates the user to a shop for which the user is set as a point member. As a result, the shop for which the user is a point member is used as original map data, linked to map data, so that the user can easily move to the shop when the user uses the shop and advertisement effectiveness is easily increased.

A data processing method according to the present invention develops and applies the data processing apparatus according to the present invention to a data processing method, which uses a computer to create customer data by linking point data concerning points given to a user from a shop, with personal data specific to the user, and to set the user as a point member, the method comprising steps of: creating shop data by linking the point data of the created customer data and shop identification data, based on a request from the user, the shop identification data including position data indicating the position of the shop and identifying the shop; and specifying the position of the shop from the created shop data, based on map data.

As a result, the same operation and advantages as achieved by the foregoing data processing apparatus according to the present invention can be achieved.

A data processing program according to the present invention can make a computer execute the foregoing data processing method according to the present invention.

In this configuration, for example, the data processing program is installed into a general purpose computer, so that the foregoing data processing method according to the present invention can be executed by the computer. As a result, use and application of the present invention can be promoted greatly.

A recording medium according to the present invention records the foregoing data processing program according to the present invention, to be readable for a computer.

In this configuration, the data processing program for executing the foregoing data processing method according to the present invention is recorded on a recording medium. Therefore, handling of the data processing program is easy, so that use and application of the present invention can be promoted greatly.

The computer mentioned herein is not limited to one single computer. For example, the configuration may include plural computers combined with each other like a network, an element such as a microcomputer, a circuit board mounting plural electronic components, and the like.

BRIEF DESCRIPTION OF THE DRAWINGS

FIG. 6 is a schematic view showing a data configuration of a personal list table having a table structure in which personal data is recorded as each one record in the embodiment;

FIG. 7 is a schematic view showing a data configuration of a group table having a table structure in which group data is recorded as each one record in the embodiment;

FIG. 8 is a schematic view showing a data configuration of a shop table having a table structure in which shop data is recorded as each one record in the embodiment;

FIG. 15 is an explanatory view showing a screen structure which invites setting for disclosing shop data of a shop for which a point card is registered in the embodiment;

FIG. 21 is an explanatory view showing a display mode in which shop data is displayed in form of a list in the embodiment;

FIG. 22 is an explanatory view showing a display mode in which shop data is displayed in form of a list in the embodiment;

FIG. 23 is an explanatory view showing a display mode in which shop data is displayed in form of a list in the embodiment;

FIG. 24 is an explanatory view showing a display mode in which shop data is displayed in form of a list in the embodiment;

FIG. 25 is an explanatory view showing a display mode in which shop data is displayed in form of a list in the embodiment;

FIG. 26 is an explanatory view showing a display mode in which shop data is displayed in form of a list in the embodiment;

FIG. 27 is a flowchart showing an operation using shop data in guide navigation to a destination in the embodiment;

FIG. 29 is an explanatory view showing point scores of shops to which guide navigation is carried out in the embodiment;

FIGS. 30A and 30B are explanatory views showing a display mode of guide navigation in which shop data is displayed in form of a map in the embodiment, where FIGS. 30A and 30B respectively show display states before and during guide navigation;

FIGS. 34A to 34D are explanatory views showing a display mode of guide navigation in which shop data is displayed in form of a map in the embodiment, where FIG. 34A shows a display state during guide navigation and FIGS. 34B to 34D show display states after rerouting;

FIG. 35A shows a display state during guide navigation and FIGS. 35B to 35D show display states after rerouting;

FIGS. 36A to 36D are explanatory views showing a display mode of guide navigation in which shop data is displayed in form of a map in the embodiment, where FIG. 36A is a display state during guide navigation in which shops not subjected to the guide navigation are not displayed and FIGS. 36B to 36D are display states during navigation which excludes shops not subjected to the guide navigation;

FIGS. 37A to 37C are explanatory views showing a display mode of guide navigation in which shop data is displayed in form of a map in the embodiment, where FIG. 37A shows a display state during guide navigation in case of shops having equal points and FIGS. 37B and 37C show display states during navigation in case of shops having different points;

DETAILED DESCRIPTION OF THE PREFERRED EMBODIMENT

Hereinafter, an embodiment of the present invention will be described with reference to the drawings.

Configuration of Data Processing System

Figure 1:
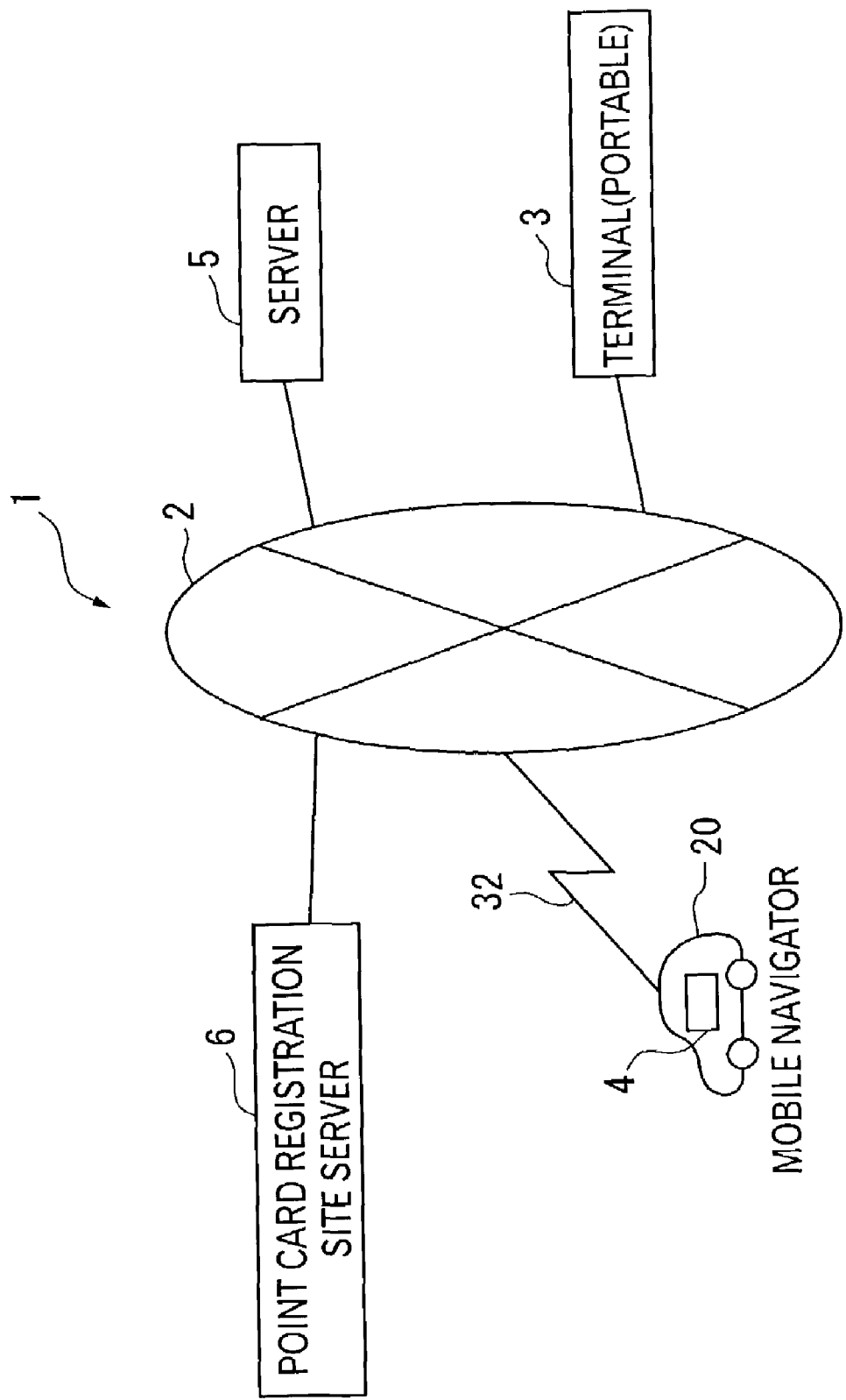
FIG. 1 is a block diagram showing a schematic configuration of an embodiment of the data processing system according to the data processing apparatus of the present invention.
Figure 2:
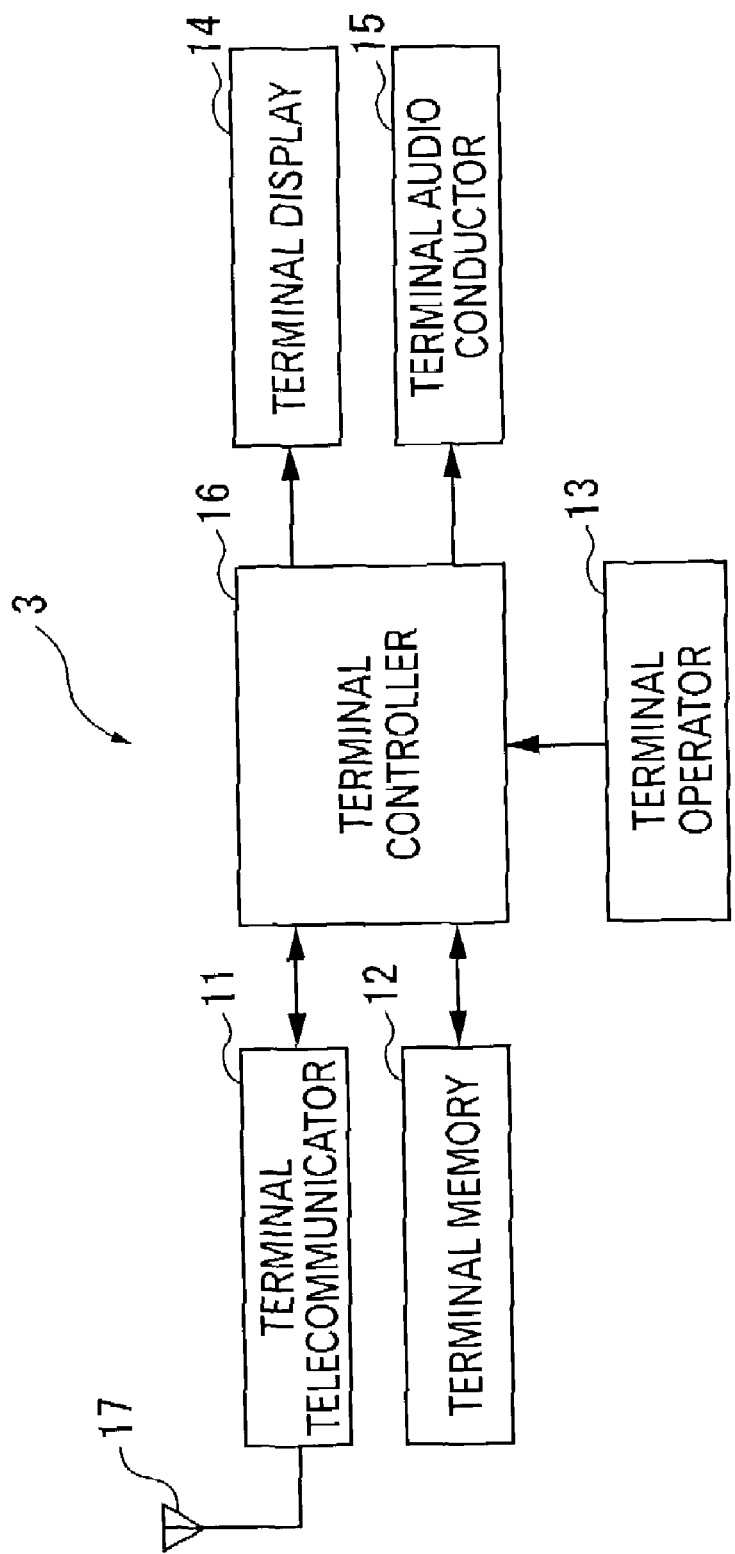
FIG. 2 is a block diagram showing a schematic configuration of a terminal in the embodiment.
Figure 3:
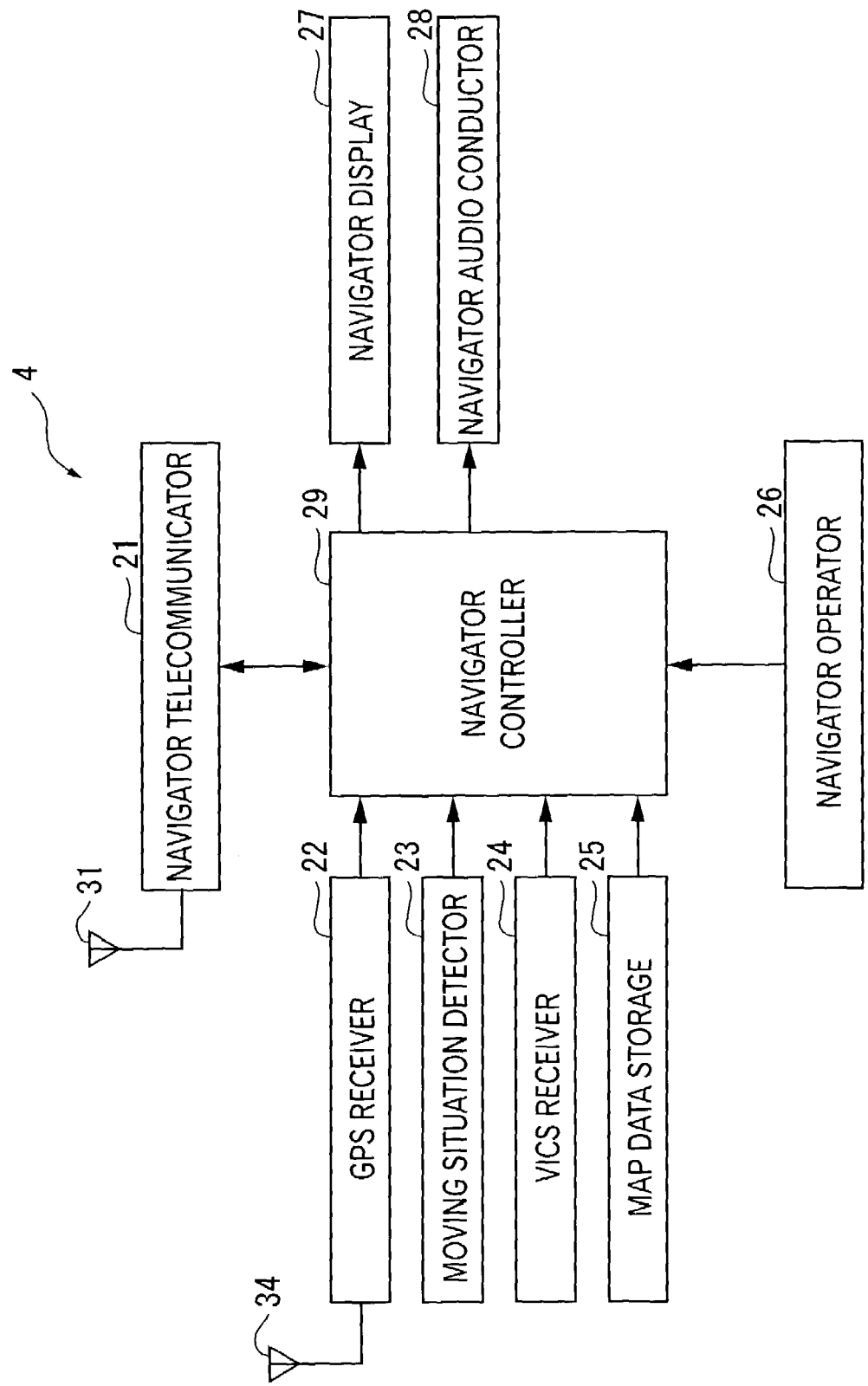
FIG. 3 is a block diagram showing a schematic configuration of a mobile navigator in the embodiment.
Figure 4:
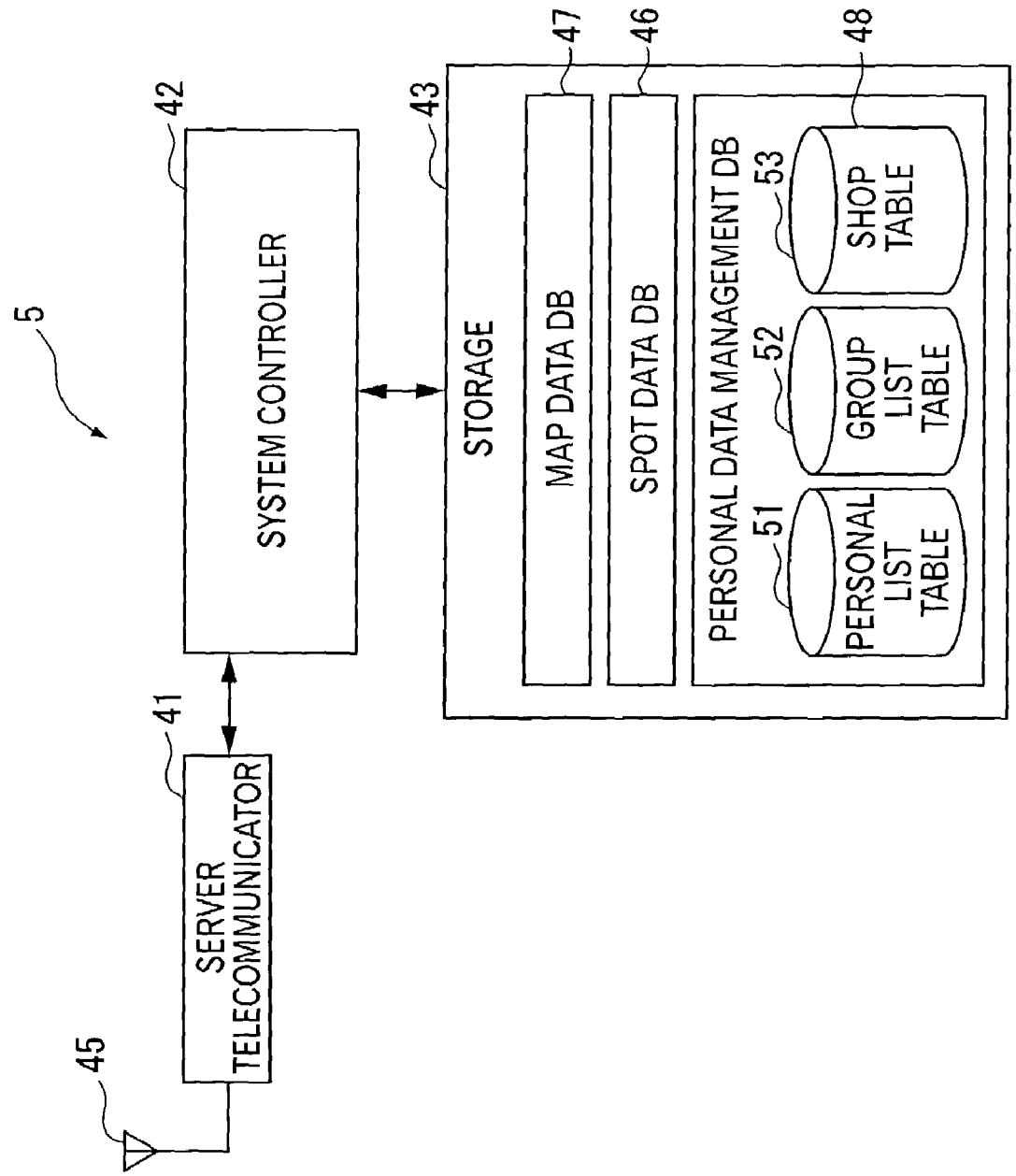
FIG. 4 is a block diagram showing a schematic configuration of a server in the embodiment.

FIG. 1 is a block diagram showing the schematic configuration of a data processing system to which the present invention is applied. FIG. 2 is a block diagram showing the schematic configuration of a terminal forming part of the data processing system. FIG. 3 is a block diagram showing the schematic configuration of a mobile navigator forming part of the data processing system. FIG. 4 is a block diagram showing the schematic configuration of a server forming part of the data processing system.

In FIG. 1, the data processing system 1 includes a network 2, a terminal 3, a mobile navigator 4, a server 5, and a registration-site server 6. The data processing system 1 serves to process location data based on map data, which expresses restaurants or recommended spots, so that the location data can be shared in common among predetermined members.

In this case, the data processing system 1 corresponds to a set of a navigation system and a data processing apparatus in the present invention. The server 5 also corresponds to a navigator in the present invention.

The network 2 is constructed as Internet or an intranet based on protocol for general purposes, such as TCP/IP (Transmission Control Protocol/Internet Protocol). The network 2 is connected to a terminal 3, a mobile navigator 4, a server 5, and a point card registration-site server 6 as a point member setting portion.

The terminal 3 is a portable terminal such as a general-purpose computer including a computer body, input device, and display device, a mobile phone or PHS (Personal Handyphone System), or the like. Installed in the terminal 3 are browser software, electronic mail software, and the like to read homepages on Internet as the network 2. Thus, various data can be transmitted/received via the network 2. Further, as exemplified in FIG. 2, the terminal 3 has a terminal telecommunicator 11, terminal memory 12, terminal operator 13, a terminal display 14, terminal audio conductor 15, and terminal controller 16 which constructs the computer body.

The terminal telecommunicator 11 has a terminal antenna 17 and transmits/receives signals to/from the network 2. The terminal telecommunicator 11 is connected to the terminal controller 16. The telecommunicator outputs a received signal to the terminal controller 16 and also outputs a signal outputted from the terminal controller 16 to the network 2.

The terminal memory 12 stores data outputted from the terminal controller 16, with the data kept readable. For example, the terminal memory may be a RAM (Random Access Memory) or a drive such as hard disk, optical disk, or magnetic disk which records data on a recording medium.

The terminal operator 13 includes various operation keys not shown but like a keyboard to operate the terminal 3 appropriately. By input from these operation keys, the terminal operator 13 properly outputs predetermined signals to the terminal controller 16 to set and input various conditions such as contents of operation of the terminal 3. The configuration of the terminal controller 13 may be modified such that various conditions can be set and inputted not only by input from operation keys but also by input from a touch panel which may be provided over the terminal display 14 or input of voice or the like.

The terminal display 14 is controlled by the terminal controller 16 and properly displays image data among data outputted from the terminal controller 16. Specifically, it is possible to use a liquid crystal display, organic EL (Electroluminescence) display, PDP (Plasma Display Panel), CRT (Cathode-Ray Tube) or the like.

The terminal audio conductor 15 has a sound generation portion not shown, such as a speaker or the like. The terminal audio conductor 15 is controlled by the terminal controller 16, and outputs audio data among data outputted from the terminal controller 16, in form of a sound through the sound generation portion.

The terminal controller 16 has various input/output ports not shown. For example, the ports are a data telecommunication port connected to the terminal telecommunicator 11, a memory connection port connected to the terminal memory 12, a key input port connected to the terminal operator 13, a display control port connected to the terminal display 14, an audio control port connected to the terminal audio conductor 15, and the like. Further, the terminal controller 16 processes data transmitted/received to/from the network 2 through the terminal telecommunicator 11, by a program extended on an installed OS (Operating System) which controls operation of the entire terminal 3. To be specific, the terminal controller 16 includes a position setting portion as a current-position data attaining portion which is in form of a program extended on the OS. The position setting portion recognizes a place, which is a start point set and inputted by the terminal operator 13, to be a pseudo-current position.

Meanwhile, as shown in FIG. 1, the mobile navigator 4 is mounted on a vehicle 20 like a passenger car as a moving object. The mobile navigator 4 operates by a power supplied from a battery not shown but mounted on the vehicle 20. The mobile navigator 4 includes a navigator telecommunicator 21, GPS (Global Positioning System) receiver 22, moving situation detector 23, VICS (Vehicle Information and Communication System) receiver 24, map data storage 25, navigator operator 26, navigator display 27, navigator voice conductor 28, and navigator controller 29.

The navigator telecommunicator 21 has a navigator antenna 31 and transmits/receives signals such as radio waves, electromagnetic waves, light waves, and sound waves, to/from the network 2 through wireless media 32. The navigator telecommunicator 21 is connected to the navigator controller 29. The telecommunicator 21 outputs received signals to the navigator controller 29 and also outputs signals from the navigator controller 29 to the network 2.

The GPS receiver 22 is connected to a GPS antenna 34. The GPS receiver 22 receives navigation waves outputted from a GPS satellite not shown, which is an artificial satellite, through the GPS antenna 34. The GPS receiver 22 calculates pseudo-coordinate value of a current position, based on a received signal. The receiver 22 further outputs the pseudo-coordinate value to the navigator controller 29.

The moving situation detector 23 has a velocity sensor not shown but provided on the vehicle 20, an azimuth sensor, acceleration sensor, and the like to detect a situation of the moving vehicle 20. The moving situation detector 23 thus detects driving states of the vehicle 20 by those sensors, and outputs the states as various driving situation data to the navigator controller 29.

The VICS receiver 24 has a VICS antenna not shown and attains traffic data via the VICS antenna. More specifically, the VICS receiver 24 obtains traffic data concerning traffic jams, traffic accidents, construction works, and traffic regulations from the Vehicle Information and Communication System (VICS), for example, via a beacon or FM multiplex broadcasting. Alternatively, the traffic data may be obtained via the network 2.

The map data storage 25 stores map data obtained from the server 5 through the network 2 by the navigator telecommunicator 21. Used as the map data storage 25 may be a RAM (Random Access Memory) or a drive which records data on a recording medium such as a hard disk, optical disk, or a magnetic disk.

The navigator operator 26 includes various operation keys not shown, to operate appropriately the mobile navigator 4, for example, by a command for displaying a driving state of the vehicle 20. By input through these operation keys, the navigator operator 26 outputs properly predetermined signals to the navigator controller 29 to set and input various conditions such as contents of operation of the mobile navigator 4 and settings of a destination. The configuration of the navigator controller 26 may be modified such that various conditions can be set and inputted not only by input through the operation keys but also by input through a touch panel which may be provided over the navigator display 27 or input of voice or the like.

The navigator display 27 is controlled by the navigator controller 29 and properly displays image data among data outputted from the navigator controller 29. Specifically, like the terminal display 14 in the terminal 3, it is possible to use a liquid crystal display, organic EL display, PDP, CRT, or the like.

Like the terminal audio conductor 15 in the terminal 3, the navigator audio conductor 28 has a sound generation portion not shown, such as a speaker or the like. The navigator audio conductor 28 is controlled by the navigator controller 29, and outputs audio data among data outputted from the navigator controller 29, in form of a sound from the sound generation portion.

The navigator controller 29 has various input/output ports not shown. For example, the ports are a GPS receiver port connected to the GPS receiver 22, a sensor connection port connected to various sensors, a VICS data receiver port connected to the VICS receiver 24, a key input port connected to the navigator operator 26, a display control port connected to the navigator display 27, an audio control port connected to the navigator audio conductor 28, and the like. Further, the navigator controller 29 executes various controls by a program extended on the OS which controls operation of the entire mobile navigator 4. To be specific, the navigator controller 29 includes a current-position data attaining portion (not shown), a moving-route search portion, and a displayable shop number setting portion, as programs extended on the OS.

The current-position data attaining portion calculates plural pseudo-positions of the vehicle 20 at present, based on velocity data and azimuth data concerning the vehicle 20 which are outputted from various sensors mounted on the vehicle. Further, the current-position data attaining portion recognizes current pseudo-coordinate value of the vehicle 20, based on GPS data concerning the current position, which is outputted from the GPS receiver 22. The current-position data attaining portion compares the calculated current pseudo-positions with the recognized current pseudo-coordinate value, for example, to calculate a current position of the vehicle 20 to be displayed on the map data displayed on the navigator display 27. Note that the current-position data attaining portion also recognizes, as a current pseudo-position, a start place or the like which is a start point set and inputted by the navigator operator 26, in addition to the current position of the vehicle 20 described above.

The moving route search portion sets a moving route from the current position attained by the current-position data attaining portion to, for example, a destination which is set and inputted by the navigator controller 26, based on map data described later. Note that the destination is not limited to a destination but may be a shop or the like as a target on a side trip to be taken, as will be described later. A moving route to such a shop on a side trip is set as an estimated route.

When shops are displayed in form of a map or list on the navigator display 27 on the basis of shop data described later, the displayable shop number setting portion sets the number of shops to be displayed, by input from the navigator operator 26.

The server 5 is constituted, for example, as a WWW (World Wide Web) server connected to the network 2. The server 5 includes a server telecommunicator 41, system controller 42, and storage 43, as shown in FIG. 4.

The server telecommunicator 41 has a server antenna 45 and transmits/receives signals to/from the network 2. The server telecommunicator 41 is connected to the system controller 42. This telecommunicator 41 outputs a received signal to the system controller 42, and also outputs a signal outputted from the system controller 42 to the network 2.

The system controller 42 executes various programs to make various processing on data communicated with the network 2 via the server telecommunicator 41. Specifically, the system controller 42 has, as programs to be extended on the OS, a group attribute data attaining portion (not shown), a group identification data preparation portion, an authentication portion, a data disclosure portion, a guidance data output portion, a participation/withdrawal processing portion, a shop data attaining portion which also functions as a shop data processing portion, a disclosure request recognition portion, a shop position specify portion as a display controller, a point conversion portion, a shop use recognition portion which also functions as a use data attaining portion, a navigation fee charge portion, and a shop search portion. The system controller 42 is connected to the storage 43. The controller 42 properly outputs attained data to the storage 43 to store the data. The system controller 42 also properly attains data stored in the storage 43 to output the data to the network 2.

The group attribute data attaining portion of the system controller 42 attains group attribute data set and inputted by the terminal 3 and received via the network 2 by the server telecommunicator 41. The group attribute data thus attained is outputted to the storage 43.

The group identification data preparation portion of the system controller 42 recognizes that group attribute data has been obtained by the group attribute data attaining portion. The group identification data preparation portion then creates specific group identification data corresponding to the attained group attribute data. The created group identification data is outputted to a terminal to which the group attribute data has been set and inputted.

The authentication portion of the system controller 42 collates the group attribute data and group identification data, which have been set and inputted by a terminal and have been attained by the server telecommunicator 41 via the network 2, with group data stored in the storage 43.

If the group attribute data and group identification data attained from the terminal 3 are recognized to be equal to pre-stored group data in the storage 43 by the authentication portion, the data disclosure portion of the system controller 42 outputs report data stored in the storage 43, i.e., allows the report data to be readable in accordance with predetermined input operation on the terminal 3.

The guidance data output portion of the system controller 42 recognizes a predetermined setting input from the terminal 3, and then outputs or provides, to a predetermined terminal 3, group attribute data and group identification data together with guidance data which invites participation in the group.

The participation/withdrawal processing portion of the system controller 42 recognizes a signal from the terminal 3, which expresses a determination on participation in a group or withdrawal from a group. The participation/withdrawal processing portion then updates the group data. That is, if the participation/withdrawal processing portion recognizes a signal expressing a determination on participation, group data is updated into new group data by linking the group attribute data corresponding to the group in which the participation is intended, with personal data inputted together with the signal expressing the determination. Alternatively, if the participation/withdrawal processing portion recognizes a signal expressing a determination on withdrawal, group data is updated into new group data by unlinking the personal data recognized together with the signal expressing a determination on withdrawal, among personal data linked with the group attribute data corresponding to the group from which the withdrawal is intended. Note that updated new group data is outputted to and stored into the storage 43.

The shop data attaining portion of the system controller 42 links together point data and shop identification data which are transmitted from the point card registration-site server 6 and received by the server telecommunicator 41 via the network 2, to attain them as shop data. As selective data to select whether the shop data should be opened or not within the group, the shop data is subjected to a processing of linking the shop data with group data.

The term of "point data" is the score of points, which is data about points given to a user in correspondence with use of a shop. The shop identification data is specific data for identifying which shop gives points. Note that there are shop identification data respectively specific to shops and are also respectively linked with position data of the shops. Further, the attained shop data is outputted to and stored into the storage 43.

In response to an input from a user requesting disclosure of shop data by operating the terminal operator 13 of the terminal 3, the disclosure request recognition portion of the system controller 42 receives a signal requesting the disclosure via the network 2, and recognizes the shop data disclosure request.

The shop position specify portion as a display controller of the system controller 42 outputs shop data to a user, in response to a predetermined input from a user by operating the terminal operator 13 of the terminal 3. That is, the shop position specify portion makes a control of displaying attained shop data on the terminal display 14 of the terminal 3 or the navigator display 27 of the mobile navigator 4 which the user is operating for the input. For example, based on position data which forms part of shop data of a shop predetermined by the input and also based on map data stored in the storage 43 described later, the shop position specify portion specifies the position of the shop predetermined by the input, in combination with the map data. The shop position specify portion then outputs the position to the user side to display it.

The point conversion portion of the system controller 42 converts points given from each shop into common unit rates. In this point conversion, for example, a coefficient corresponding to a shop code and stored in a storage not shown is used to convert points in point data transmitted from the registration-site server 6. For example, each point may be converted into a service worth ¥100. Suppose there is a shop A which provides a service worth ¥1000 for every 500 points as well as a shop B which provides a service worth ¥1000 for every 1,000 points. In this case, the shop A takes 2 points as one system point while the shop B takes 1 point as one system point.

Alternatively, the point conversion portion may converts points such that a payment price which gives 1 point is an unit price identical to every shop. Suppose there is a shop A which gives 1 point for every ¥500 as well as a shop B which gives 1 point for every ¥1,000. In this case, the shop A takes 0.5 points as one system point while the shop B takes 1 point as one system point. Furthermore, the point conversion portion may appropriately set a conversion coefficient in view of consumption tax or the like. Thus, the point conversion portion performs a conversion processing such that points given from each shop can be evaluated by a common unit rate.

The shop use recognition portion of the system controller 42 recognizes that a user has used a shop. The use of the shop by the user is recognized by receiving data inputted at the time of a reservation, order, or payment at the shop or receiving a signal expressing a completion of a payment from an organizer who manages an IC card used for the payment. Further, the shop use recognition portion separately makes the storage 43 store the frequency at which the user used the shop in the past, as use data concerning use frequency. The shop use recognition portion also recognizes the size of the point score as use data.

The navigation fee charge portion of the system controller 42 executes controls for inquiring a fee payment from each shop, for example, by outputting a signal expressing charging of a fee to a terminal computer of a shop or a predetermined financial institution, as will be described later.

The shop search portion of the system controller 42 executes a processing of searching for a shop existing within a predetermined area inputted by the terminal 3 or the mobile navigator 4, based on position data of shop data. If a device itself has the function to search for a shop like the mobile navigator 4, the mobile navigator 4 may be let search for the shop, or a search result for reducing a load on the mobile navigator 4 to search for a shop may be outputted to and appropriately displayed on the mobile navigator 4.

The storage 43 has a hard disk, optical disk, or magnetic disk, for example, to store data outputted from the system controller 42. Further, the storage 43 is provided with a spot data database 46, map data database 47 as a map data storage, and personal data management database 48.

The spot data database 46 is constituted as a database having a table structure in which spot data outputted from the system controller 42 and including name data of a shop, class data, content data of the shop, geographical position data, and the like is recorded as each one record. Note that the spot data database 46 can not only store spot data attained via the network 2 but also spot data set and inputted by an input portion not shown but connected to the system controller 42.

Figure 5:
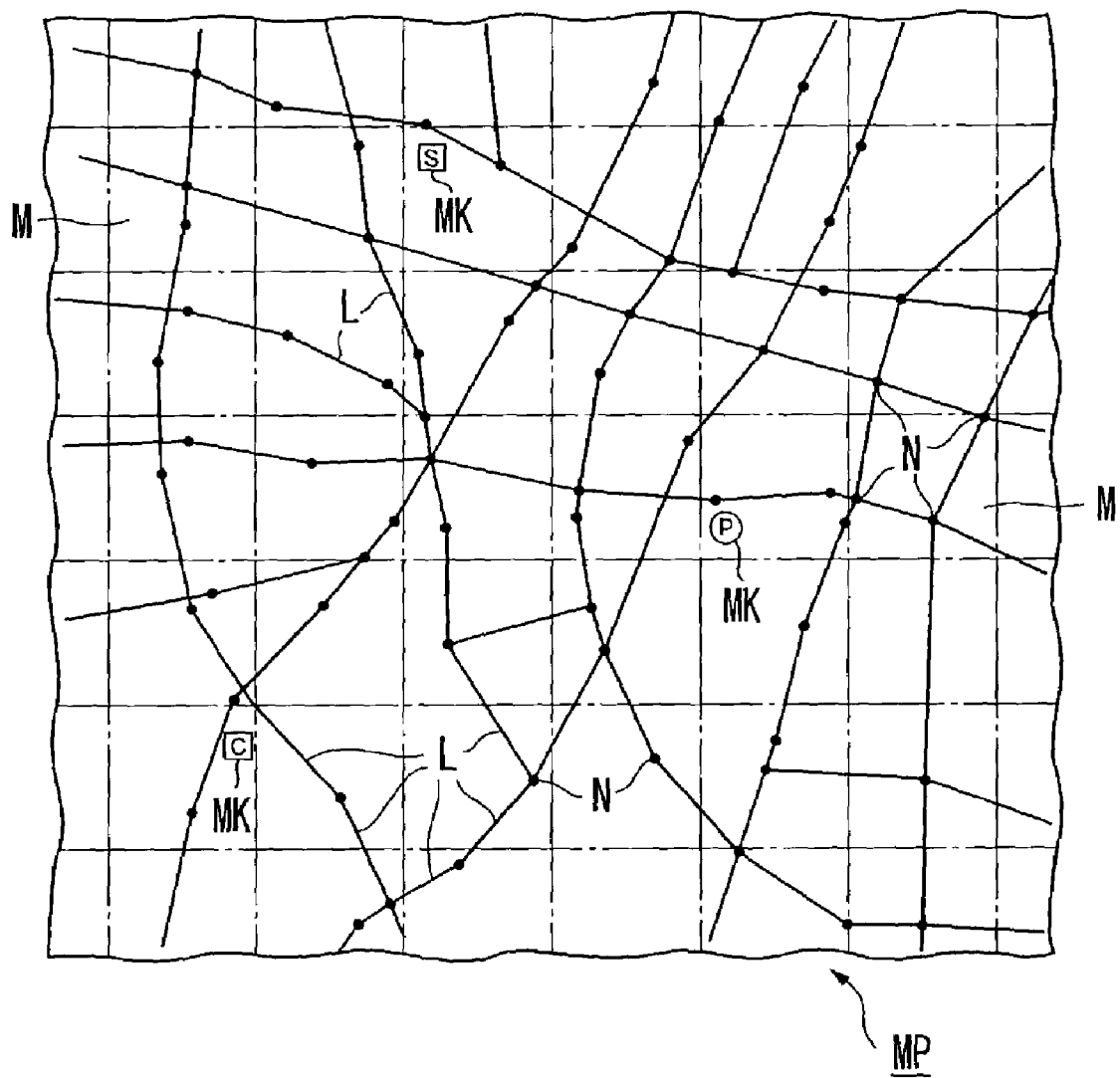
FIG. 5 is a schematic view showing a data configuration of map data in the embodiment.

The map data database 47 stores map data. The map data has a data configuration as shown in FIG. 5. FIG. 5 is a schematic view showing the data configuration of the map data.

In FIG. 5, MP is map data and has plural pieces of mesh data M respectively assigned by specific numerals. These pieces of mesh data M each has edges of a preset length scaled down from actual geographical scales so as to comply with the scales of maps. Further, the map data MP is constituted by continuously connecting the plural pieces of mesh data M in longitudinal and lateral directions.

Further, roads are constituted on the map data MP by continuously connecting nodes N and links L each of which is a segment connecting two of the nodes N (e.g., black dots in FIG. 5). The nodes N correspond to connection points such as intersections, corner points, branch points, junction points, and the like on roads. Data concerning the nodes N includes position data of the position of each node N, which consists of latitude and longitude, specific numerals assigned respectively to the nodes N, and branch data expressing whether or not each node N is a branch position such as an intersection or a branch point where plural links cross each other. Data concerning the links L includes specific numerals (hereinafter called link IDs) respectively assigned to the links L, and node data expressing the specific numerals of two nodes N which are connected by each link L.

The map data MP is provided with famous spot data including marks which indicates famous places and buildings and position data expressing latitude and longitude of the places and buildings. The map data MP is further provided with title data including names of crossings and the like.

The map data MP includes plural pieces of map data MP which show one same area in different scales. Various data including the node data, link ID, famous spot data, and title data as described above is provided for every one of the pieces of map data MP having different scales. The map data MP can be updated by adding new road data or the like via an input portion not shown but connected to the system controller 42.

The personal data management database 48 appropriately stores shop data as personal data, group data, and report data. That is, the personal data management database 48 includes a personal list table 51 as a personal data storage, a group list table 52 as a group data storage, and a shop table 53 as a report data storage.

The personal list table 51 stores personal data, for example, as shown in FIG. 6. Specifically, the personal list table 51 is constituted as a database having a table structure in which user ID (identification) data, name data, address data, and gained point score data ("System point" in the figure) in the present data processing system 1 are recorded as each one record. The system points shown in FIG. 6 are converted into common unit rates such that different evaluations of points among shops are standardized on one equal unit rate.

The group list table 52 stores group data, for example, as shown in FIG. 7. Specifically, the group list table 52 is constituted as a database having a table structure in which group ID data as group identification data, password data also as group identification data, group name data as group attribute data, creator data, member ID data, registration time data, registration date data, and the like are recorded as each one record. The creator data is linked with the personal data, as shown in FIG. 7, to link the personal data with the group data.

The shop table 53 stores shop data, for example, as shown in FIG. 8. Specifically, the shop table 53 is constituted as a database having a table structure in which shop code data as shop identification data, user ID data, shop genre data, position data as location data including latitude data and longitude data of a shop, attained point data, group ID data ("Open group ID" in FIG. 8) expressing a group ID of a group to which the data is open, and the like are recorded as each one record. Note that the shop code data is linked with shop genre data and spot data as location data of a shop. As has been explained above, the system controller 42 links the shop code data with the attained point data. In addition, the shop genre data and the position data of the shop are linked on the basis of the shop code data, and recorded as each one record in the shop table 53.

Meanwhile, the registration-site server 6 manages data concerning points and users who have registered with a so-called point system in which shops serve users with the points as added values. The registration-site server 6 is, for example, a server managed by a shop. Like the server 5, the registration-site server 6 controls the entire server 6 itself and has a controller not shown, which transmits/receives data concerning points to/from the network 2, and a point database also not shown, which stores data concerning the points transmitted/received. The controller includes a personal data attaining portion not shown, which attains personal data specific to a user, customer data preparation portion, and an input setting portion which forms part of a setting input recognition portion.

The personal data attaining portion of the registration-site server 6 attains data about requirements including personal data which is set and inputted via a network by input from the terminal operator 13 of the terminal 3, for example.

The customer data preparation portion creates customer data, linking data about requirements with point data of a user. The created customer data is outputted to the point database. The point database has a table structure in which the created customer data is stored as one record.

The input setting portion which forms part of the setting input recognition portion of the registration-site server 6 is constituted to make a link with the server 5, for example, in form of an icon of "Side Trip" on a point card registration-site. Note that the input setting portion is not limited to the configuration as an icon but may have any configuration as far as it recognizes an input operation from a user to transfer data to the server 5, e.g., it suffices that the input setting portion simply recognizes an input operation on the terminal operator 13 of the terminal 3 or the navigator operator 26 of the mobile navigator 4 used by a user.

Operation of Data Processing System

Operation of the data processing system 1 described above will now be described with reference to the drawings.

(Registration of a System Member)

Figure 9:
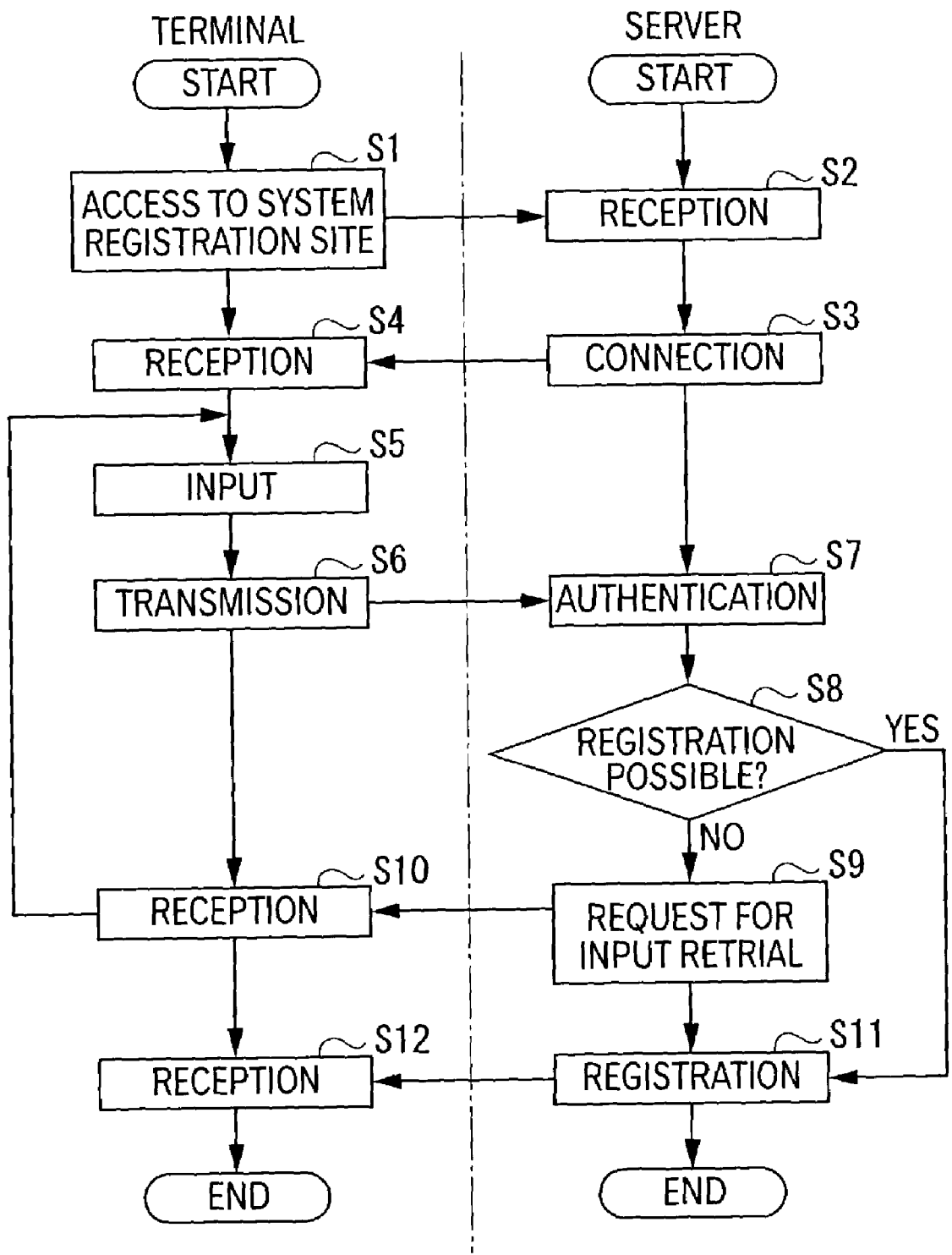
FIG. 9 is a flowchart showing an operation of registering a system member in the embodiment.

Firstly, description will be made of an operation of member registration to use the data processing system 1 with reference to FIG. 9. FIG. 9 is a flowchart showing the operation of registering a system member.

To use the data processing system 1, an applicant for use of the system accesses a system registration-site by a terminal 3 or mobile navigator 4 (step S1). Specifically, the applicant operates the terminal operator 13 of the terminal 3 or the navigator operator 26 of the mobile navigator 4, to connect to the server 5 via the network 2. The applicant then selects the system registration-site from a main site of the data processing system 1 and requests a connection.

The system controller 42 of the server 5 recognizes the request for connection to the system registration-site from the applicant, by the server telecommunicator 41 (step S2). The system controller 42 makes the connection and transmits a guide which invites the applicant to input predetermined requirements (step S3). The guide transmitted in step S3 is received by the terminal 3 or the mobile navigator 4 (step S4). The applicant then inputs the predetermined requirements in accordance with the guide (step S5), and transmits them to the server 5 (step S6).

Data of the requirements transmitted in step S6 is received by the server 5 (step S7). The system controller 42 determines whether the data of the requirements are acceptable or not (step S8). In step S8, if the data of the inputted requirements is determined to be not acceptable, the system controller 42 transmits a guide which invites retrial of the input (step S9). The guide for the retrial of the input is received by the terminal 3 or the mobile navigator 4 (step S10). The procedure returns to the step S5. The applicant then retry the input in accordance with the guide.

In step S8, if the data of the inputted requirements is determined to be acceptable, the system controller 42 carries out registration by a processing of storing personal data as one record consisting of the requirements, into the personal list table 51 in the personal data management database 48, for example, as shown in FIG. 6 (step S11). Then, the system controller 42 transmits data about a guide notifying the registration, user ID, and personal password, to the terminal 3 or mobile navigator 4. The terminal 3 or mobile navigator 4 receives the guide notifying completion of the registration, the user ID, and the personal password (step S12). The processing of registering a system member is thus finished.

(Registration of New Group)

Figure 10:
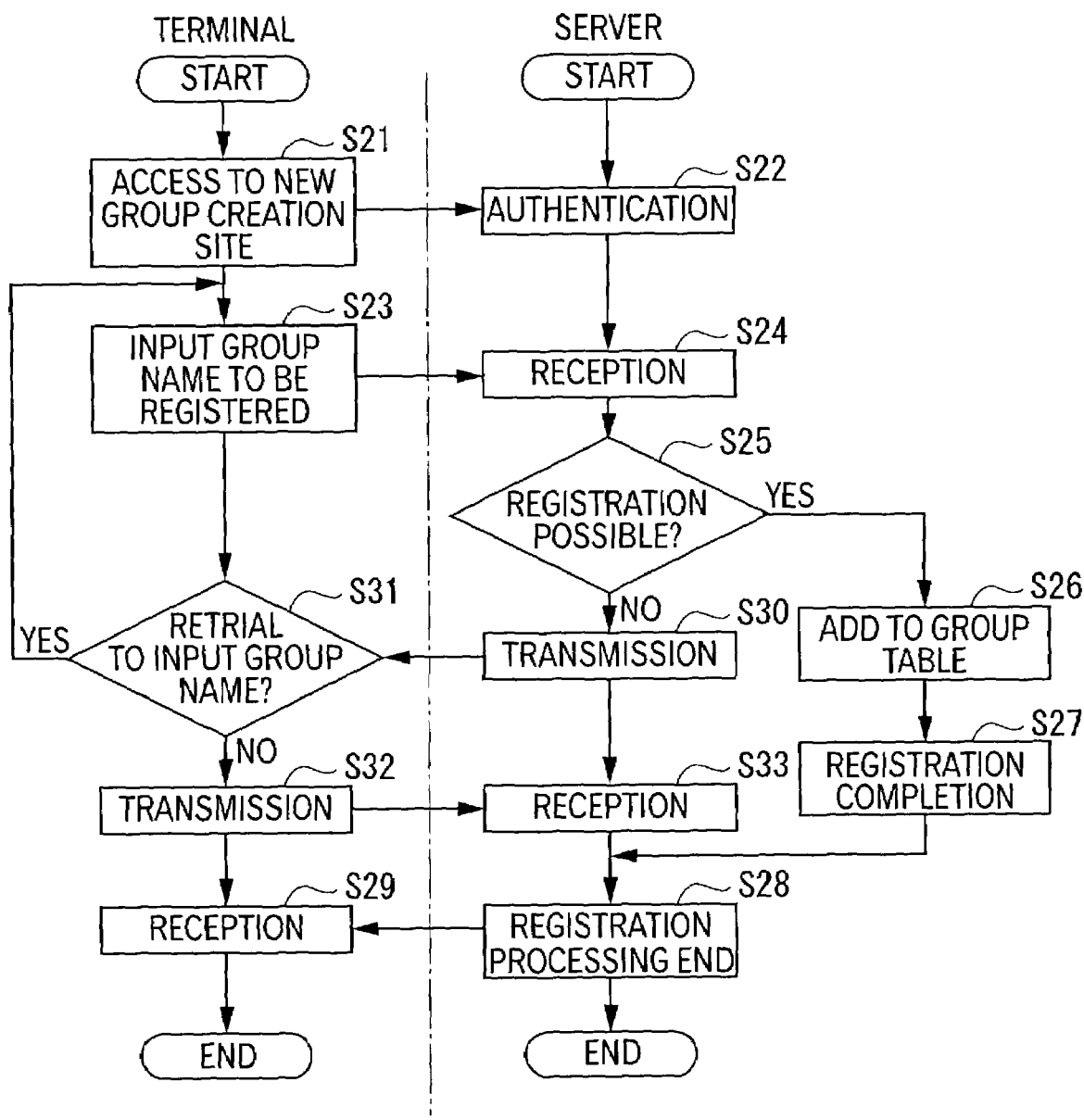
FIG. 10 is a flowchart showing an operation of registering a new group in the embodiment.

Next description will be made of an operation of registering a group in which users as members of the data processing system 1 share data in common, with reference to FIG. 10. FIG. 10 is a flowchart showing an operation of registering a group.

Firstly, a user accesses a site for creating a new group by the terminal 3 or mobile navigator 4 (step S21). Specifically, the user operates the terminal operator 13 of the terminal 3 or the navigator operator 26 of the mobile navigator 4, to connect to the server 5 via the network 2 and further to the main site of the data processing system 1. The user then selects the site for creating a new group from the main site and requests a connection.

The system controller 42 of the server 5 recognizes the request for connection to the site for creating a new group from the user, by the server telecommunicator 41. The system controller 42 then transmits a guide which invites the user to input a user ID and personal password, to confirm membership of the user in the data processing system 1. Based on the guide transmitted, the user then inputs the user ID and personal password which the user have attained previously by the processing shown in the flowchart in FIG. 9.

Based on the input of the user ID and personal password, the system controller 42 of the server 5 executes a comparison with personal data stored in the personal list table 51 in the personal data management database 48. Further, the system controller 42 authenticates the user's membership (step S22), and then executes a control to connect the terminal 3 or the mobile navigator 4 to the site for creating a new group in the server 5.

In accordance with instruction from the accessed site for creating a new group, the user operates the terminal operator 13 or the navigator operator 26, to input the name of a group to be registered (step S23). The name data of the inputted group is outputted from the terminal telecommunicator of the terminal 3 and is received by the server telecommunicator 41 of the server 5 via the network 2.

In step S24, the name data of the group is compared with group data stored in the group list table 52 in the personal data management database 48 by the system controller 42. The system controller 42 determines whether a same name as the new group has already been stored or not (step S25).

Further, if it is determined in step S25 that no group having the same name has been registered and the new group name can be registered, the system controller 42 automatically creates a group ID and group password for the group. Then, the system controller 42 executes a processing of adding, as one record, the group name data, group ID data, and group password, together with the user ID data of the user who created the group, and the time data and date data expressing when the group was created, to the group list table 52 of the personal data management database 48 (step S26).

Upon completion of the registration by the processing in step S26 (step S27), the system controller 42 transmits a guide notifying the completion of the registration processing and including data expressing the registered group name, group password, and URL (Universal Resource Locator) of a site for adding members, to the terminal 3 or the mobile navigator 4 (step S28). Registration completion data thus transmitted is received by the terminal 3 or the mobile navigator 4 (step S29), and the processing of creating a new group is finished.

In step S25, if the system controller 42 determines that a group having the same name as the new group has already been registered, the system controller 42 transmits a guide notifying that the inputted name has already been registered and a different name should be inputted, to the terminal 3 or the mobile navigator 4 (step S30). If the user retries the input in accordance with the guide in step S30 which invites the user to input a different group name (step S31), the procedure returns to the step S23.

Alternatively, if the input is not retried in step S31, the user does not input a different group name and notifies the server 5 of cancellation of the registration of a new group (step S32). A signal which notifies the cancellation of the retrial is received by the system controller 42 (step S33), the system controller 42 terminates the registration processing for creating a new group, and outputs a guide notifying the cancellation of the processing of registering a new group, to the terminal 3 or mobile navigator 4. The processing of registering a new group thus ends.

(Guide for Participation in Group)

Figure 11:
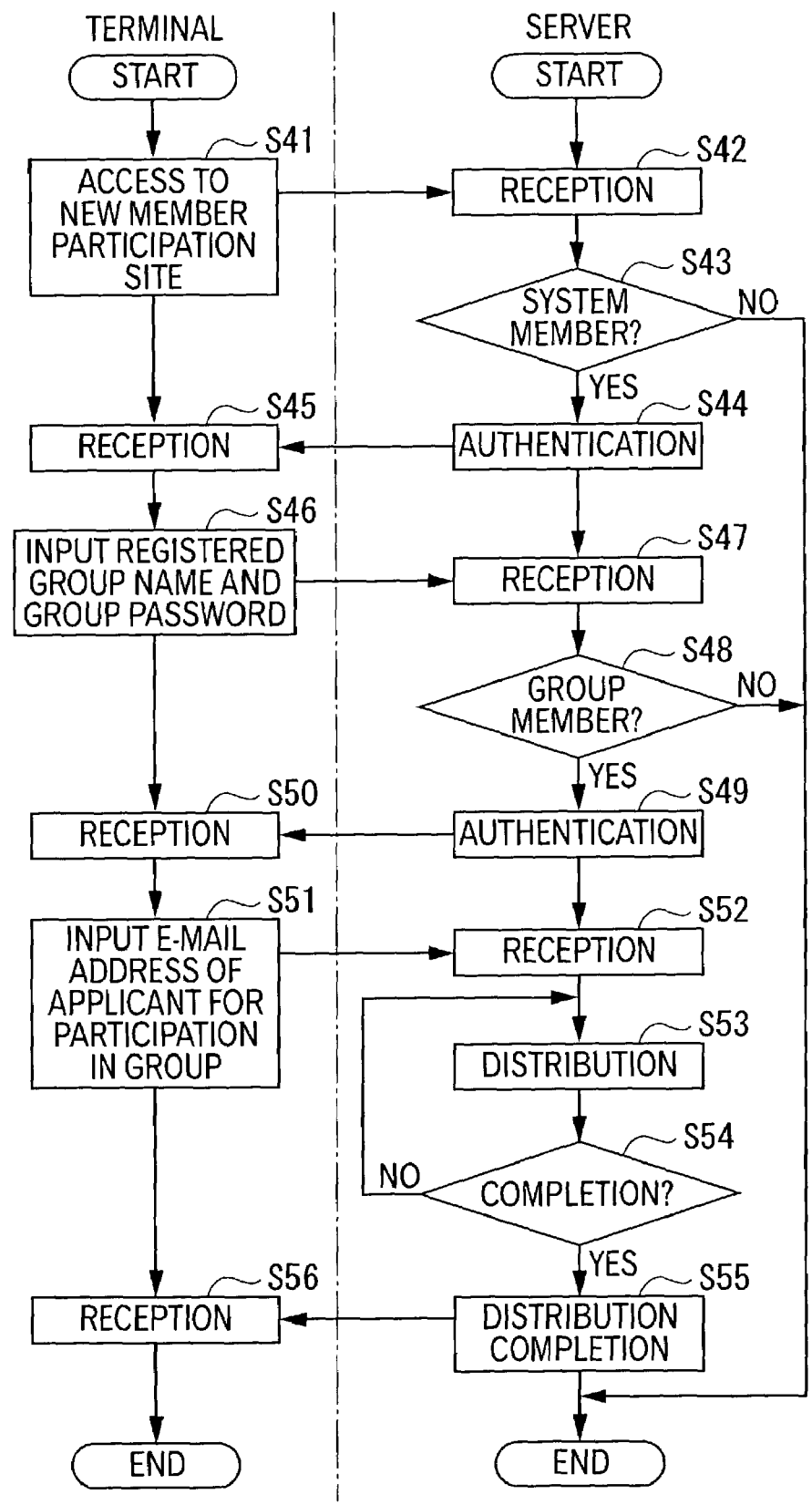
FIG. 11 is a flowchart showing an operation for guiding participation of a member in a group in the embodiment.

An operation of guiding a specific person to participation in a registered group will now be described with reference to FIG. 11. FIG. 11 is a flowchart showing an operation of adding a member to a group.

Firstly, an organizer or member of a group accesses a new-member participation site by the terminal 3 or mobile navigator 4 (step S41). Specifically, the organizer or member of the group operates the terminal operator 13 of the terminal 3 or the navigator operator 26 of the mobile navigator 4, to connect to the server 5 via the network 2 and further to the main site of the data processing system 1. The organizer or member then selects the new member participation site in the main site and requests a connection thereto.

The system controller 42 of the server 5 recognizes the request for connection to the new member participation site, by the server telecommunicator 41. The system controller 42 then transmits a guide which invites input of a user ID and personal password, to confirm membership of the data processing system 1. Based on the guide transmitted, the organizer or member then inputs the user ID and personal password which the user have attained previously by the processing shown in the flowchart in FIG. 9.

Upon receipt of the user ID and personal password inputted (step S42), the system controller 42 of the server 5 compares the ID and password with personal data stored in the personal list table 51 in the personal data management database 48, to determine whether the organizer or member is a system member or not (step S43). If the organizer or member is not determined to be a system member, the system controller 42 cancels access to the new member participation site and the processing ends. Alternatively, the processing may be arranged so as to give a guide which invites retrial to input a correct user ID and a correct personal password. If retried input fails a predetermined number of times or if cancellation of access is inputted, the access to the new member participation site may be cancelled and the processing may then be terminated.

If it is determined in step S43 that the organizer or member is a system member, the system controller 42 transmits a guide notifying that the user ID and personal password inputted have been authenticated, to the terminal 3 or mobile navigator 4. The system controller 42 then executes a control to connect the terminal 3 or the mobile navigator 4 to the site for creating a new group in the server 5 (step S44). The organizer or member of the group receives and checks the guide notifying the authentication (step S45), and then inputs the group name and group password which have been previously attained (step S46).

The server 5 receives the group name and group password inputted from the terminal 3 or mobile navigator 4 in step S46 (step S47). Then, the system controller 42 compares the group name and group password with group data stored in the group list table 52 in the personal data management database 48, to determine whether the organizer or member is a group member or not (step S48). That is, whether or not the inputted group name and group password are correct or not is determined. If the group name or the group password or both are incorrect and the organizer or member is not determined to be a group member, access to the new member participation site is cancelled and the processing ends. Alternatively, the processing may be arranged so as to give a guide which invites retrial to input a correct group name and a correct group password. If retried input fails a predetermined number of times or if cancellation of access is inputted from the terminal 3 or the mobile navigator 4, the access to the new member participation site may be cancelled and the processing may then be terminated.

In step S48, if the group name and group password are correct and the organizer or member is determined to be a group member, a guide notifying authentication of the group name and group password is transmitted to the terminal 3 or mobile navigator 4 (step S49). Further, the organizer or member receives the guide notifying the authentication from the server 5, and checks the guide (step S50). Then, in accordance with the guide, the organizer or member inputs an E-mail address of a user to whom the group should be introduced.

The server 5 receives the mail address inputted in step S51 (step S52), the system controller 42 distributes by E-mail a guide which invites participation in the group based on the inputted mail address (step S53). The guide which invites participation in the group may include, for example, the group name, group password, and data of URL designating a group site which contains data readable only for the members of the group.

Whether or not the distribution of the guide inviting participation in the group has been completed in step S53 is determined (step S54). If completion of the distribution processing is recognized, a guide notifying the completion is transmitted to the terminal 3 or mobile navigator 4 (step S55). The terminal 3 or mobile navigator 4 receives the guide notifying the completion of the distribution processing (step S56), and the processing of guiding participation in a group ends thereby.

(Participation of New Member in Group)

Figure 12:
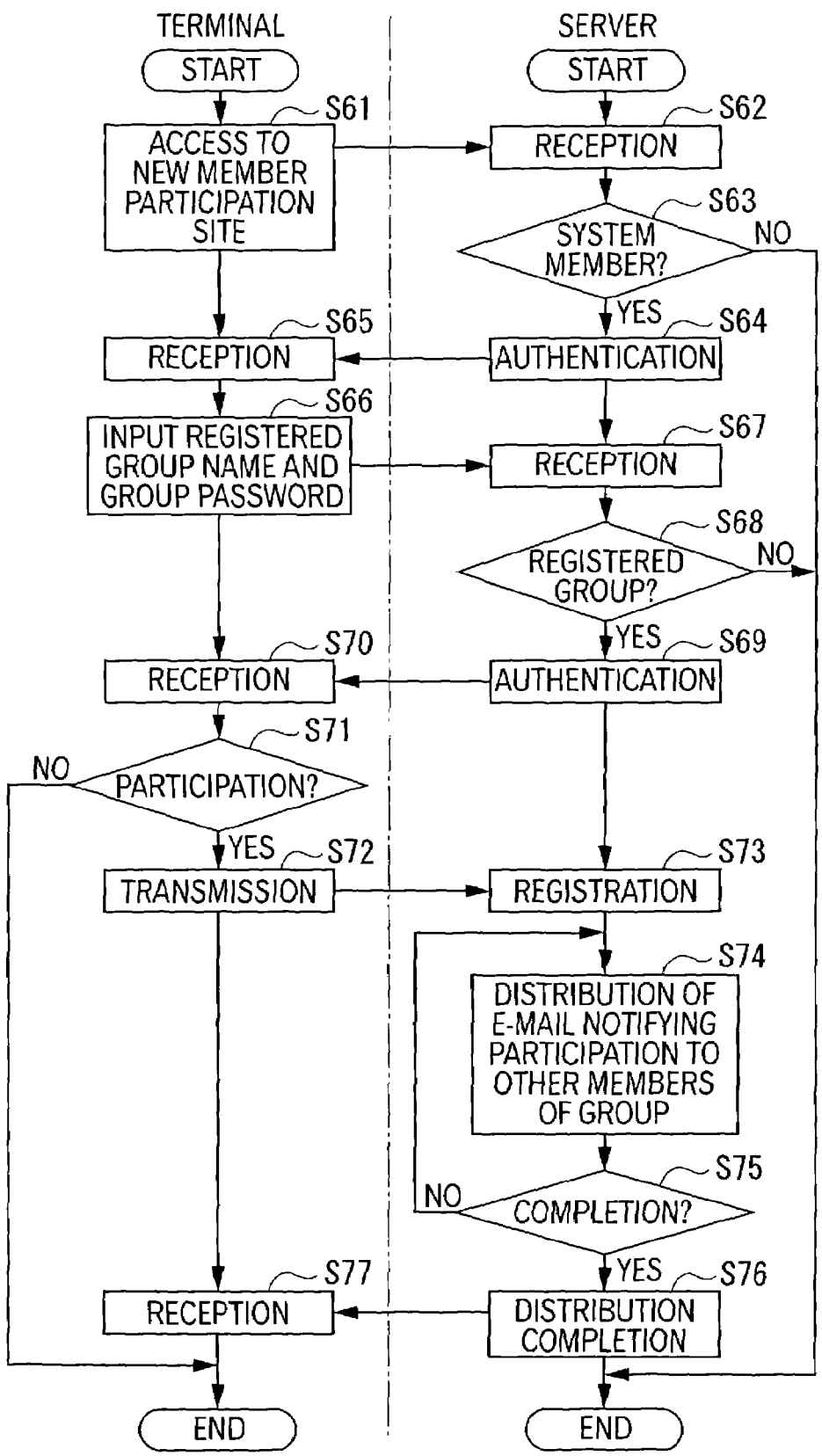
FIG. 12 is a flowchart showing an operation for newly participating in a group in the embodiment.

An operation of participation of a new member in a registered group will now be described with reference to the drawings. FIG. 12 is a flowchart showing the operation of participation of a new member in a group.

Firstly, a user who is a system member uses the terminal 3 or mobile navigator 4 to access the new member participation site, based on the guide for participation in a group, which is attained by the operation shown in the flowchart in FIG. 11, or based on a guide attained from the organizer or a member of the group (step S61). Specifically, the user operates the terminal operator 13 of the terminal 3 or the navigator operator 26 of the mobile navigator 4, to connect to the server 5 via the network 2 and further to the main site of the data processing system 1. The user then selects the new member participation site in the main site, and requests a connection thereto.

The system controller 42 of the server 5 recognizes the request for connection to the new member participation site, by the server telecommunicator 41. The system controller 42 then transmits a guide which invites input of a user ID and personal password, to confirm membership of the data processing system 1. Based on the guide transmitted, the user then inputs the user ID and personal password which the user have attained previously. Upon receipt of the user ID and personal password inputted (step S62), the system controller 42 compares the ID and password with personal data stored in the personal list table 51 in the personal data management database 48, to determine whether the user is a system member or not (step S63). If the user is not determined to be a system member, the system controller 42 cancels access to the new member participation site and the processing ends. Alternatively, the processing may be arranged so as to give a guide which invites retrial to input a correct user ID and a correct personal password. If retried input fails a predetermined number of times or if cancellation of access is inputted from the terminal 3 or mobile navigator 4, the access to the new member participation site may be cancelled and the processing may then be terminated.

If it is determined in step S63 that the user is a system member, the system controller 42 transmits a guide notifying that the user ID and personal password inputted have been authenticated, to the terminal 3 or mobile navigator 4. The system controller 42 then executes a control to connect the terminal 3 or the mobile navigator 4 to the site for creating a new group in the server 5 (step S64). The user of the group receives and checks the guide notifying the authentication (step S65), and then inputs the group name and group password which have been attained previously by an E-mail guiding participation or directly from another member (step S66).

The server 5 receives the group name and group password inputted from the terminal 3 or mobile navigator 4 in step S66 (step S67). Then, the system controller 42 compares the group name and group password with group data stored in the group list table 52 in the personal data management database 48, to determine whether the group name and group password belong to a registered group or not (step S68). That is, whether or not the inputted group name and group password are correct or not is determined. If the group name or the group password or both are incorrect and are not determined to belong to any registered group, access to the new member participation site is cancelled and the processing ends. Alternatively, the processing may be arranged so as to give a guide which invites retrial to input a correct group name and a correct group password. If retried input fails a predetermined number of times or if cancellation of access is inputted from the terminal 3 or the mobile navigator 4, the access to the new member participation site may be cancelled and the processing may then be terminated.

In step S68, if the group name and group password are correct and the user is determined to be a group member, a guide notifying authentication of the group name and group password and inquiring whether the user participates in the group is transmitted to the terminal 3 or mobile navigator 4 (step S69). Further, the user receives and checks the guide notifying the authentication and inquiring the participation from the server 5 (step S70). Then, in accordance with the guide, the user inputs whether the user participates in the group or not (step S71).

If an input expressing that the user does not participate in the group is made in step S71, the processing of participation of a new member to the registered group is terminated. Alternatively, if the user inputs participation in the group in step S71, the input expressing the participation is transmitted to the server 5 (step S72). The system controller 42 executes registration of a member (step S73). Specifically, the system controller 42 executes a processing of adding, as one record, the group name data, group ID data, and group password, together with the user ID data inputted in step S61 and the time data and date data expressing when the data was created by the processing of the member registration, to the group list table 52 of the personal data management database 48.

Further, the system controller 42 distributes a guide reporting the participation of a new member, to other members in the group in which the new member has participated (step S74). Specifically, based on the group data recorded on the group list table 52 in the personal data management database 48, the system controller 42 searches for member ID data of the same group. Referring to the member ID data thus searched for, the system controller 42 distributes the guide reporting the participation of the new member, based on E-mail address data which forms part of the personal data stored in the personal list table 51.

After completion of the distribution of the guide by E-mail (step S75), the system controller 42 transmits a guide notifying that the processing of registering the new member has been finished and the guide has been distributed to other members in the group, to the terminal 3 or the mobile navigator 4 (step S76). The transmitted guide is received by the terminal 3 or the mobile navigator 4 (step S77), and the processing of participation of a mew member ends.

Although a guide reporting participation of a new member is distributed to other members in the group by E-mail in step S74, it need not always be distributed. That is, after a new member is registered in step S73, a guide notifying the registration of the new member may be transmitted to the terminal 3 or the mobile navigator 4. Further in step S77, the terminal 3 or the mobile navigator 4 may receive the guide, and the processing may thereby be terminated.

(Point Management for System Members)

Figure 13:
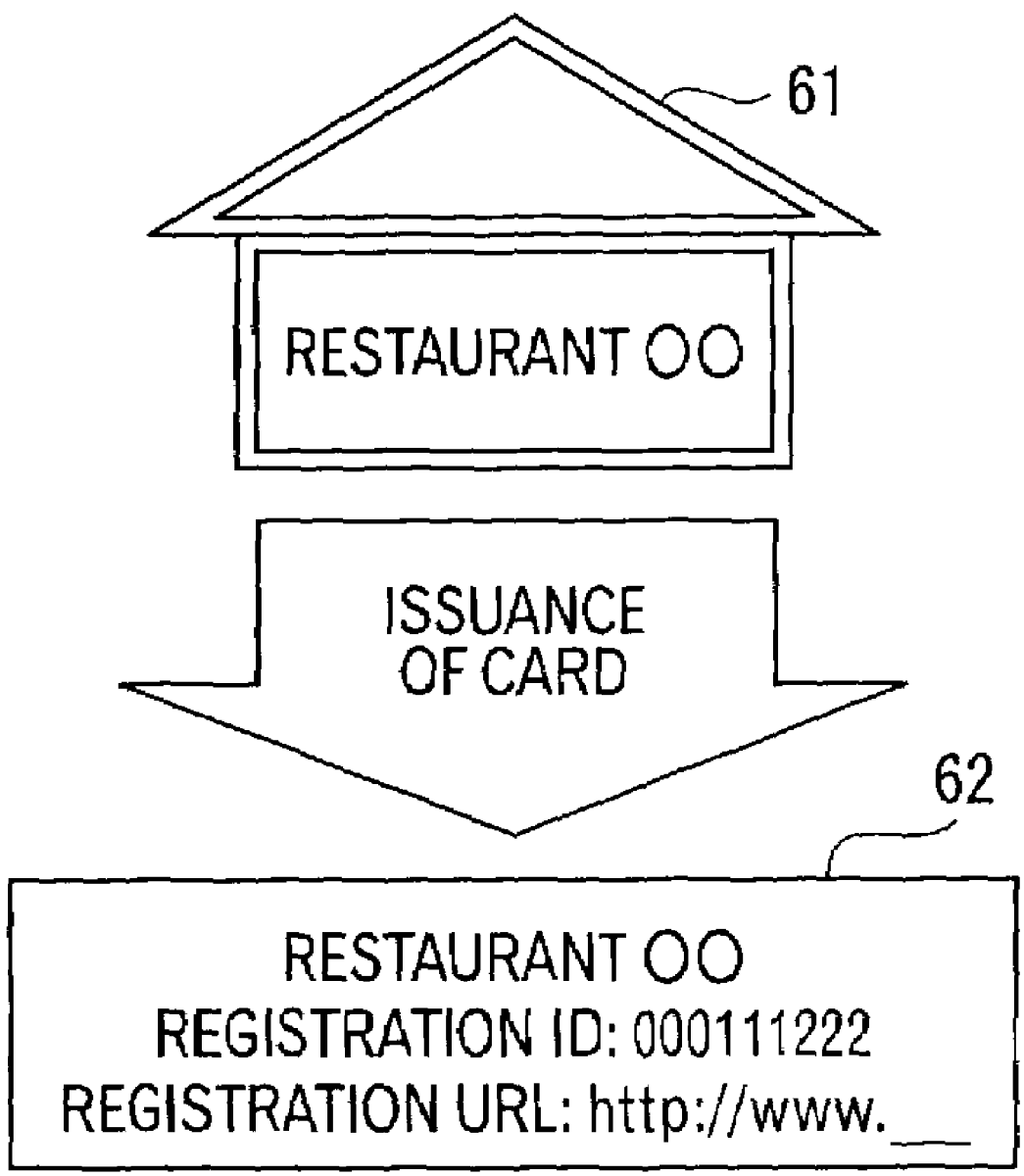
FIG. 13 is an explanatory view for an operation for registering a point card of a system member in the embodiment.
Figure 14:
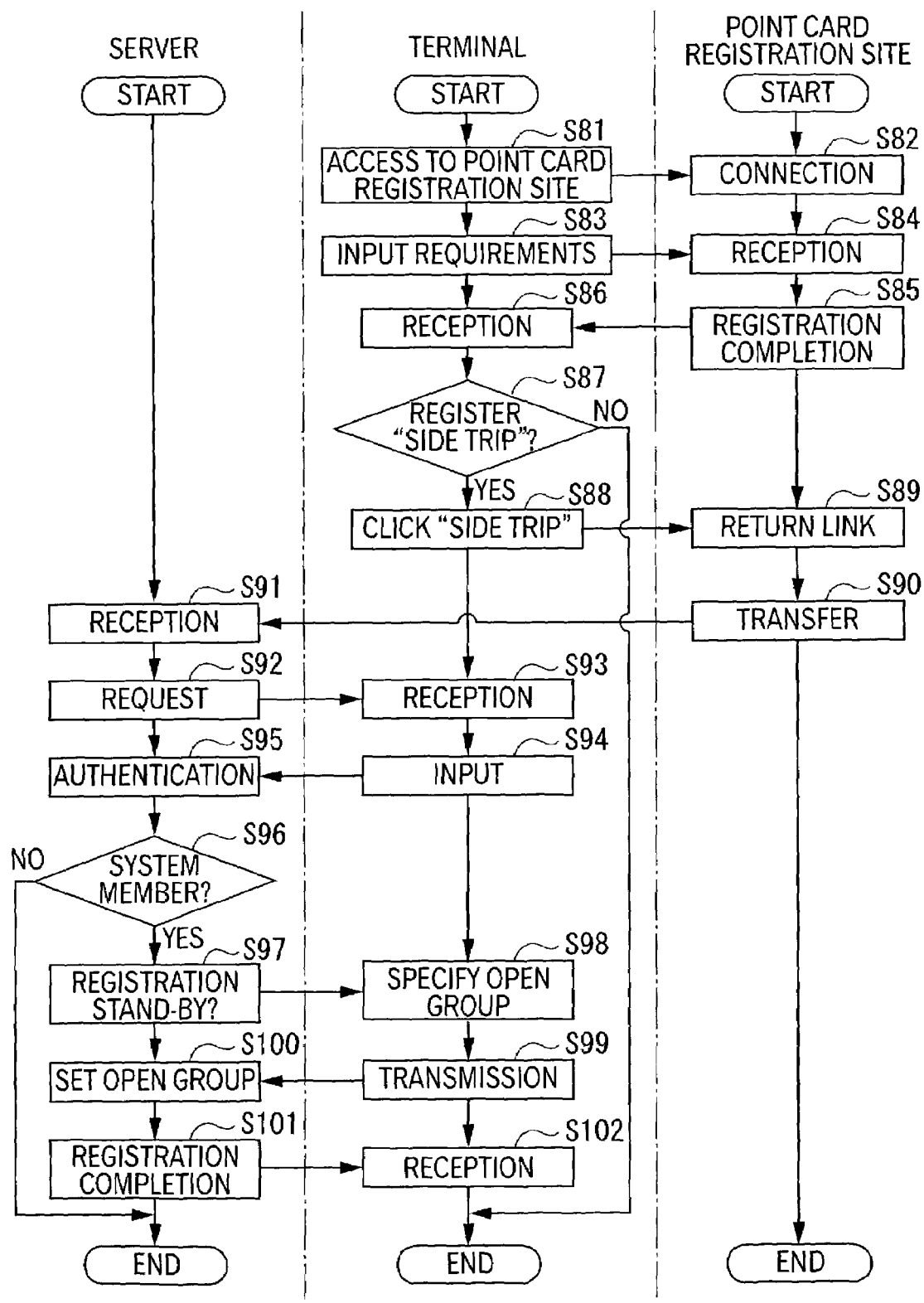
FIG. 14 is a flowchart showing an operation for registering a point card in the embodiment.

An operation of registering points as data of users who have a membership of the data processing system 1 will now be described with reference to the drawings. FIG. 13 is a schematic view showing a point system registration card for registering a point card distributed from a shop. FIG. 14 is a flowchart showing an operation of registering a point card. FIG. 15 is a schematic view showing a guide which invites an input to tell whether shop data should be open to groups or not. In this case, points are rates used in a so-called point system. For example, as shown in FIG. 13, the point system is a service from a shop 61 such as a restaurant or electric appliance shop. Points are given to a user when he or she user the shop 61. Various services are provided when points are stored to some extent.

When a user uses the shop 61, the shop 61 provides a point system registration card 62 which authenticates registration for a point system to which the shop 61 belongs, as shown in FIG. 13. Recorded on the point system registration card 62 are the name of the shop 61, a registration ID assigned to the shop 61 (where registration IDs are assigned respectively to shops), and URL of a point card registration-site for management of point cards.

The user who has attained the point system registration card 62 carries out registration for the point system. Specifically, the user uses the terminal 3 or mobile navigator 4 to access the point card registration-site via the network 2, based on the URL data of the point card registration-site recorded on the point system registration card (step S81).

The access to the point card registration-site in step S81 is made by operating the terminal operator 13 of the terminal 3 or the navigator operator 26 of the mobile navigator 4. Connection is made to the registration-site server 6 managed by the shop 61 via the network 2, and further to a main site of the point card registration-site. Then, the user selects to connect the new registration-site in the main site of the point card registration-site (step S82).

Further, based on a guide which invite to input predetermined requirements, the user inputs the requirements by operating the terminal operator 13 or mobile navigator 26 (step S83). The requirements may be the name, address, and E-mail address of the user, for example, like the case of personal data as described above.

The requirements inputted in step 83 are received by the registration-site server 6 (step S84). The received requirements are stored as one record into a point database (not shown), thus completing the point card registration. Then, the registration-site server 6 transmits a guide notifying the completion of the point card registration, to the terminal 3 or mobile navigator 4 (step S85). The guide transmitted from the registration-site server 6 in step S85 is received by the terminal 3 or the mobile navigator 4 (step S86). The user thus recognizes that the point card registration has been completed.

The user further sets an input in response to a displayed suggestion, which is provided in the point card registration-site and invites the user to input whether data of the used shop 61 should be processed by the data processing system 1 or not (step S87). The input about whether the data processing system 1 should share the shop data or not may be carried out, for example, by operating the "Side Trip" icon which is provided in the point card registration-site as an operator forming part of the setting input recognition portion to shift to the data processing system 1.

If the "Side Trip" icon is not operated in step S87, i.e., if the shop data is not shared by the data processing system 1, the processing of the point card registration ends. Waiting for an operation on the "Side Trip" icon expires in a predetermined time period after receipt of the guide notifying the completion of registration, or is terminated when the user sets termination of the point card registration by the terminal operator 13 or the navigator operator 26.

If the "Side Trip" icon is operated in response to the guide in step S87 (step S88), the registration-site server 6 recognizes the operation and executes a processing of linking the terminal 3 or the mobile navigator 4 with the server 5 which constitutes the data processing system 1 (step S89). Further, the registration-site server 6 transmits the shop data together with the registration data of the user inputted in step S83, to the server 5 (step S90).

The server 5 receives the registration data of the user and the shop data which are transmitted in step S90 (step S91). The server 5 then outputs a signal which enables transmission/reception of data to/from the terminal 3 or mobile navigator 4 (step S92). Further, the terminal 3 or mobile navigator 4 receives the signal from the server 5 (step S93), and the user ID and personal password are inputted in order to connect to the server 5 by an operation from the terminal operator 13 and navigator operator 26 (step S94).

The server 5 receives the user ID and personal password inputted in step S94 (step S95). The system controller 42 of the server 5 compares the user ID and personal password with personal data stored in the personal list table 51 in the personal data management database 48, to determine whether the user is a system member or not (step S96).

If the user is determined to be a not system member in step S96, the point card registration processing ends. Alternatively, a guide may be given to invite retrial to input a correct user ID and a correct personal password. If retried input fails a predetermined number of times or if cancellation of access is inputted, the point card registration processing may then be terminated.

If it is determined in step S96 that the user is a system member, the system controller 42 transmits a guide inviting input about whether the shop 61 which has been registered for the point card should be opened or not to a group in the data processing system 1 in order to create shop data in the data processing system 1 (step S97). That is, the system controller 42 transmits a guide as shown in FIG. 15. In this guide concerning a group to be opened, the group in which the user participates is searched for from the group list table 52, for example, based on the user ID recognized in step S95, and the name of the searched group is announced. The guide shown in FIG. 15 is an example which displays a comment saying that the shop 61 has been registered for the point card, the name of the group in which the user participates, and plural check boxes 64 corresponding to names of groups and provided to specify a group to which the shop is opened.

The user then operates the terminal operator 13 or the navigator controller 26, to input which group the data of the shop 61 subjected to the point card registration in accordance with the guide should be opened to (step S98). The user then transmits the inputted data to the server 5 (step S99). The server 5 attains the data transmitted from the terminal 3 or the mobile navigator 4 (step S100). The server 5 creates shop data as shown in FIG. 8, and makes the data stored as one record in the shop table 53. Recorded as one record of the shop data are the user ID attained in step S95, and the group ID data of the group attained in step S95, to which the shop data should be opened to be opened, together with a shop code transmitted in step S90, a genre code expressing the type of the shop 61, latitude and longitude data as position data of the shop 61 searched from the shop code on the basis of the map data MP in the map data database 47.

Further, a notification saying the completion of creation of the shop data in step S100 is transmitted to the terminal 3 or mobile navigator 4 (step S101). The terminal 3 or mobile navigator 4 receives the notification (step S102), and the point card registration processing thus ends.

As has been described above, a specific group is created on a site from personal data and group data so that data can be shared only within the group. Therefore, a specific shop 61 can be opened only to members of the group so that the shop 61 might not be crowded and the members can use the shop 61 like a hiding place, for example. In addition, it is possible to avoid troublesome labor of distributing the data of the shop 61 to each of particular members. Further, the data concerning the shop 61 together with map data MP is opened to the group, so that accumulation or disclosure of data can be achieved easily with high efficiency.

(Use of Data in Data Processing System)

Figure 16:
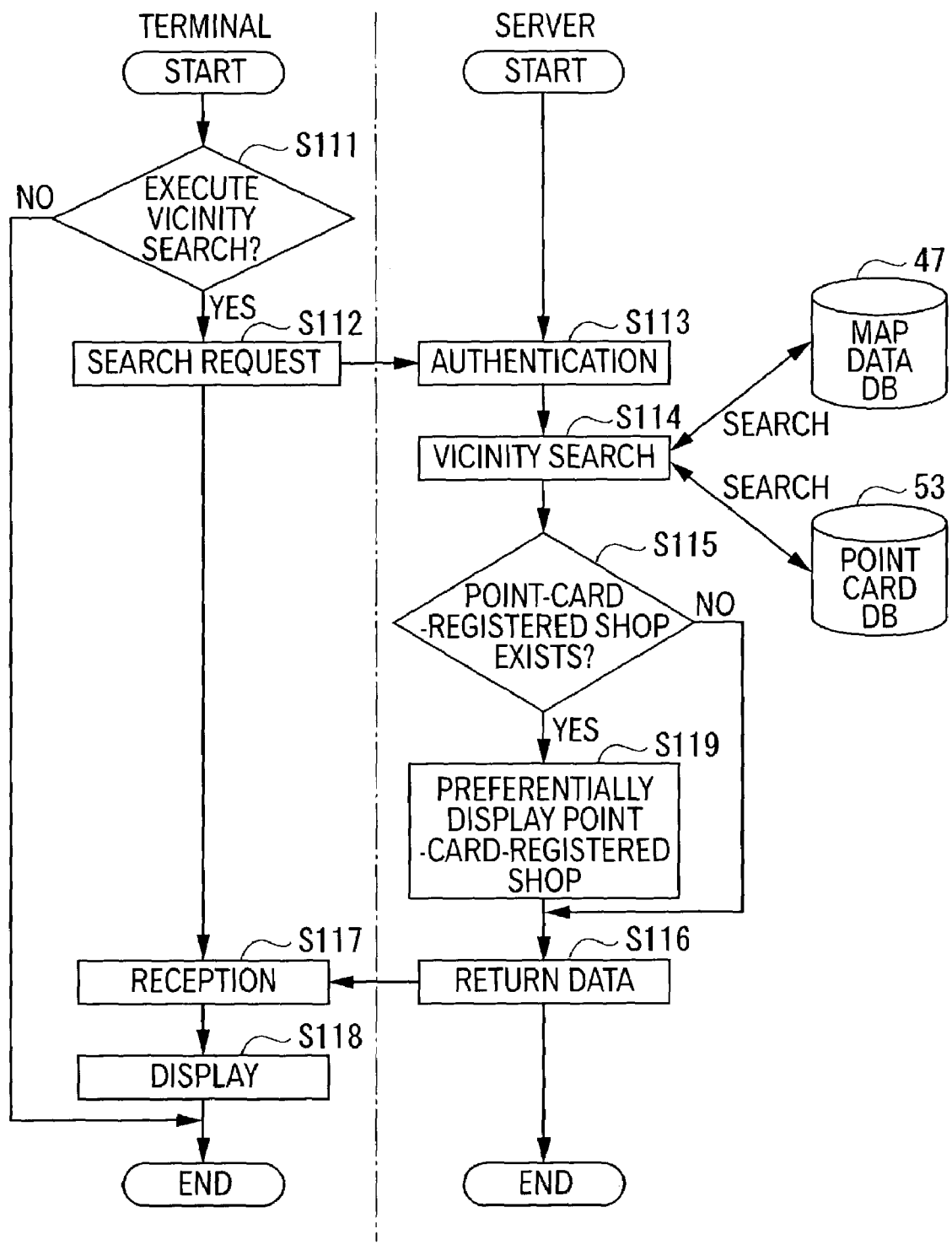
FIG. 16 is a flowchart showing an operation of using shop data in the embodiment.
Figures 17, 18:
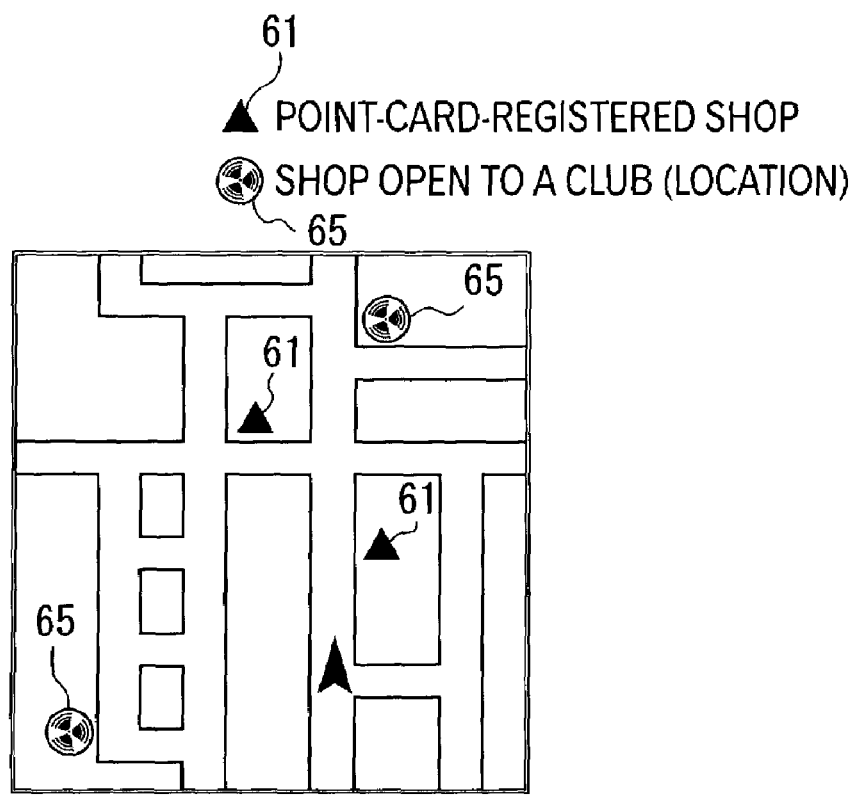
FIG. 17 is an explanatory view showing a displayed suggestion which invites an input to set a display mode in which shop data should be displayed in the embodiment.
FIG. 18 is an explanatory view showing a display mode in which shop data is displayed in form of a map in the embodiment.

A processing operation for shop search as use of data accumulated in the data processing system 1 will now be described with reference to the drawings. FIG. 16 is a flowchart showing an operation of disclosing shops registered for a point card. FIG. 18 is a flowchart showing an operation of collecting a handling fee as an advertisement expense in a case of navigation to shops registered for a point card.

Firstly, to attain shop data for food and drink or shopping, a user arranges a setting for using a vicinity search processing of the data processing system by the terminal 3 or mobile navigator 4, as shown in FIG. 16 (step S111). According to the setting in step S11, the terminal 3 or mobile navigator 4 transmits a signal requesting execution of the vicinity search to the server 5 (step S112).

When the server 5 recognizes the signal requesting execution of the vicinity search (step S113), the system controller 42 of the server 5 executes the vicinity search (step S114). In the vicinity search, for example, current position data of the terminal 3 or mobile navigator 4 or position data set and inputted as a destination is attained. Further, shops 61 which stand within an area range of a predetermined radius from the current position, based on various data concerning shops stored in the spot data database, map data MP stored in the map data database 47, and position data of shop data stored in the shop table 53 in the personal data management database 48.

As a result of the vicinity search in step S114, a determination is made on whether the shops 61 registered for the point card exist within the area range or not (step S115). If the shops 61 registered in the point system is not determined to exist within the area range, data of the shops 61 contained in the map data MP is directly transmitted to the terminal 3 or the mobile navigator 4 (step S116). The terminal 3 or the mobile navigator 4 receives the transmitted data of the shops 61 (step S117), and displays the data on the terminal display 14 or the navigator display 27 (step S118). The processing of the vicinity search thus ends.

To display the data in step S118, a screen inviting a selection of display mode is displayed as exemplified in FIG. 17.

Figure 19:
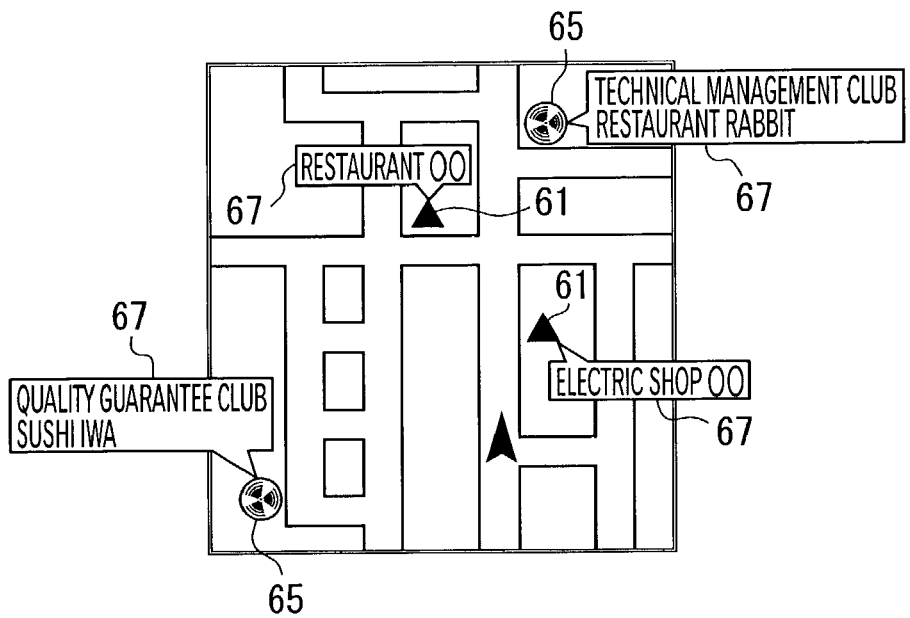
FIG. 19 is an explanatory view showing a display mode in which shop data is displayed in form of a map in the embodiment.
Figure 20:
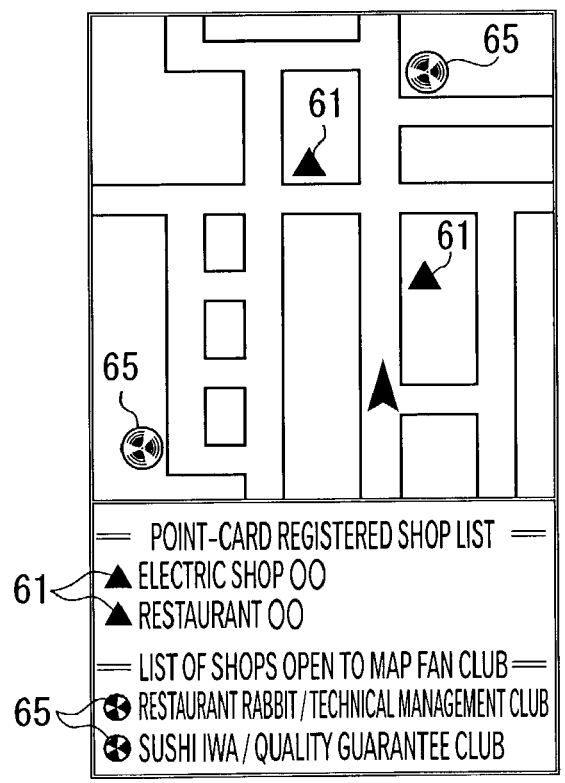
FIG. 20 is an explanatory view showing a display mode in which shop data is displayed in form of a map in the embodiment.

By operating the terminal operator 13, for example, "Display in map mode" is selected and inputted. Based on the shop data stored in the shop table 53, the vicinal shops 61 are displayed in the map data MP as various icons, specifying the positions of the shops 61. Specifically, in a predetermined surrounding area within a predetermined distance from the current position, e.g., in the map area on the screen displayed on the navigator display 27 of the mobile navigator 4, shops 65 opened to the group, shops 61 registered for the point card, and advertisement client shops are displayed respectively in different forms of icons. In this case, the displayed forms of icons should preferably arranged such that the advertisement client shops, the shops 65 opened to the group, and the shops registered for the point card have higher visibilities in the order described. The shops 65 opened to the group may be displayed in a different form for every different group. Further, as shown in FIG. 19, captions 67 may be displayed linking from the icons of the shops 61 and 65. In addition, a caption 67 may displayed upon a click on a icon of the shops 61 and 65. Alternatively, as shown in FIG. 20, a processing may be adopted to display an explanation on another window different from the window of the map mode.

By operating the terminal operator 13 to select and input "Display in list mode", for example, names of the shops 61, points, and system points which are expressed in common unit rates are listed up as shown in FIG. 21. Further, by operating the terminal operator 13 to select and input "Display in map-list mixed mode", for example, data is displayed in both of the map mode and List mode mixed.

When many shops 61 are to be displayed, the map or the like is hard to see. Therefore, a constraint may be applied in advance to the program such that 10 shops or less should be displayed in the order from the shop having the greatest system points. Alternatively, the number of shops 61 to be displayed may be set by an input operation on the terminal operator 13, or the display modes may further be selected depending on the types of shops.

On the other side, if it is determined in step S115 that there exist shops 61 registered for the point card, a processing is applied to give priority to the shops 61 which have been registered for the point card in displaying the shops (step S119). Further, data processed in step S119 is transmitted to and displayed appropriately on the terminal 3 or mobile navigator 4 in step S116.

For example, suppose that the spot data database 46 in the storage 43 contains both of data, such as names and position data, concerning shops which contract to insert advertisement, and data of shops for each of which the user is a point member and which is stored in the shop table 53. As shown in FIG. 22, the display may be controlled as follows. The shops for each of which the user is a point member are displayed, positioned at the top of a list. Rows of the shops which contract to insert advertisement may further be partitioned by a fat line in the list.

FIG. 22 shows an example in which displayed shops are not classified depending on the types. This is an example of random display mode in which three shops for each of which the user is a point member and seven advertisement client shops are displayed, where the shops for each of which the user is a point member are listed in the order from the greatest system points. If this random display mode is arranged to display 10 shops and if the shops are displayed in the order from the closest one to the current position or in the descendent order of an alphabet, it may be difficult to display effectively the advertisement client shops within such a limited number of shops. Hence, to display advertisement client shops, the random display mode should be switched to normal display mode, so that seven or more advertisement client shops if any can be displayed in the list to increase advertisement effectiveness.

Further, the display ratio in number between the shops for each of which the user is a point member and the advertisement client shops can be set appropriately or preset. In addition, the shops may be listed in any order, e.g., the order from the smallest points, the order from the shops located near the current position the order according to the use frequency, the order from the shop for which the expiration date of the point member comes first, the order from the shop which undergoes a special service period such as a double point service, the order from the shop which opens earlier, the order from the shop which the user ordered, reserved, or paid money to the greatest number of times in the past, the order from the shop to which the user was navigated the greatest number of times in the past, etc. Particularly, uses of the user may be totaled and reflected on the list display. Then, the displayed list can be much fitter for the actual uses of the user.

In addition, the background color of the rows of the shops 61 for which the user is a member may be changed to a conspicuous color, not only in the cases where the shops 61 for which the user is a member and the advertisement client shops are partitioned by a fat line but also in other cases.

Other processing of displaying the shops for each of which the point card is registered in greater priority to the other shops for which the point card is not registered may adopt any display methods as follows. For example, in step S118, the icons of the shops 61 are displayed to be larger than icons of other shops, colored differently, flickered, brighter, with shaper profiles without vagueness, or the like, from icons of other shops.

In some case, no desired shop 61 is displayed in the random display mode. Therefore, the display mode should preferably be arranged so as to display shops depending on the types of shops 61 set and inputted by the terminal operator 13, for example, as shown in FIG. 23. In this display mode depending on the types of the shops, various types may be previously registered in the program. Alternatively, the type of a shop 61 for which the user is a point member may be recognized, and shops of the recognized type may be displayed. For example, if a shop 61 for which the user is a point member is an electric appliance shop, electric appliance shops may be listed on the display.

Further, a clock counter (not shown) provided in the terminal 3 or mobile navigator 4 to measure time recognizes that it comes to a time band for a meal, restaurants may be displayed at a given ratio on the list. In addition, while the vehicle 20 moves using the mobile navigator 4, timings for rest may be counted on the basis of a moving distance, time, or a signal from a gyro sensor, and shops 61 as rest points may be displayed on the list.

Alternatively, if there are shops which are registered for report data to be opened within a group, only the shops opened to the group may be listed, for example, as shown in FIG. 24.

As shown in FIG. 25, the part of the list including the shops for each of which the user is a point member, the part of the list including the shops opened to the group, and the part of the list including the advertisement client shops may be displayed, partitioned from each other, in combination with the random display mode shown in FIGS. 22 and 23. In this case, the parts of the list should preferably be partitioned from each other by fat lines or displayed respectively in different background colors, so that the respective partitioned parts can be easily distinguished from each other. In addition, shops opened to groups may be displayed in various display modes as described above, e.g., in the descendent order of the alphabet, for every group to open the shops, in the order from the shop closer to the current position, or the like.

The display modes are not limited to the partitioning depending on classifications of shops based on their relationships with the user, such as the shops 61 for each of which the user is a point member, the shops which are opened to a group, the advertisement client shops, or the like. For example, the shops may be displayed according to the order of the use frequency, search frequency, or payment frequency, by the user in the past, as shown in FIG. 26.

By the processing shown in the flowchart in FIG. 16, labor of registering points at the shops 61 are not necessitated any more, so the point management and customer management can be performed easily by using computers. Since the shops 61 for which the point card has been registered are displayed prior to other shops, the user can easily search for the shops 61 for which the user's point card has been registered, and feasible use of shops owing to use of points can be improved, thereby increasing conveniences. Furthermore, since advertisement client shops are displayed, the advertisement effectiveness is greater compared with the case of merely inserting advertisements on WWW sites. As a result, use of the system can be enhanced.

(Data Processing in Guide Navigation)

A processing operation in guide navigation as use of data stored in the data processing system 1 will now be described with reference to the drawings. FIG. 27 is a flowchart showing an operation of navigation to a shop for which a point card has been registered.

When a user moves to a predetermined destination using the mobile navigator 4, the user operates the navigator operator 26 to input and set a moving route. In setting a moving route, various route search conditions such as a route of the shortest time, a route of the shortest distance, a route of avoiding jams and regulations are set together with the destination. According to the setting, the navigator controller 29 recognizes the current position, based on GPS data, velocity data, azimuth data, and acceleration data. The controller 29 further calculates and sets a moving route from the current position to the destination, based on map data MP which has been attained in advance.

The navigator controller 29 also recognizes relevant shops 61, based on data concerning the set destination as shown in FIG. 27 (step S121). The navigator controller 29 then controls, for example, the navigator display 27 to display a guide which invites to input about whether the relevant shops 61 should be searched for or not (step S122). More specifically, if the destination is a golf course, the guide invites the user to input whether the user would buy goods such as golf balls or the like, whether the user would have a meal, or whether the user would practice in a driving range on the way to the golf course.

The user hence inputs to search for relevant shops 61. The navigator controller 29 then connects to the server 5 to search for shops 61 in the vicinity of the moving route, and transmits shop data thereof if any to the mobile navigator 4. Further, the user sets a desired shop 61 (step S123). Upon this setting, the mobile navigator 4 reroutes the moving route which contains the shop 61 set as a side-trip point on the route, finally determines a moving route, and displays the determined moving route appropriately on the navigator display 27.

If a shop 61 for which the user's point card has been registered is found as a result of the search for relevant shops 61, the shop may be displayed with higher visibility than other shops.

Figure 28A:
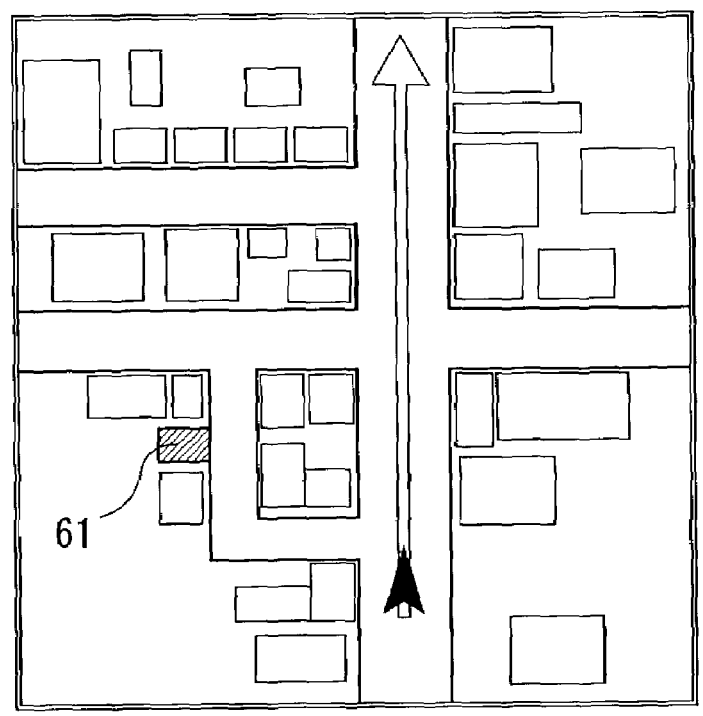
FIGS. 28A and 28B are explanatory views showing a display mode of guide navigation in which shop data is displayed in form of a map in the embodiment, where FIGS. 28A and 28B respectively show display states before and during guide navigation.
Figure 28B:
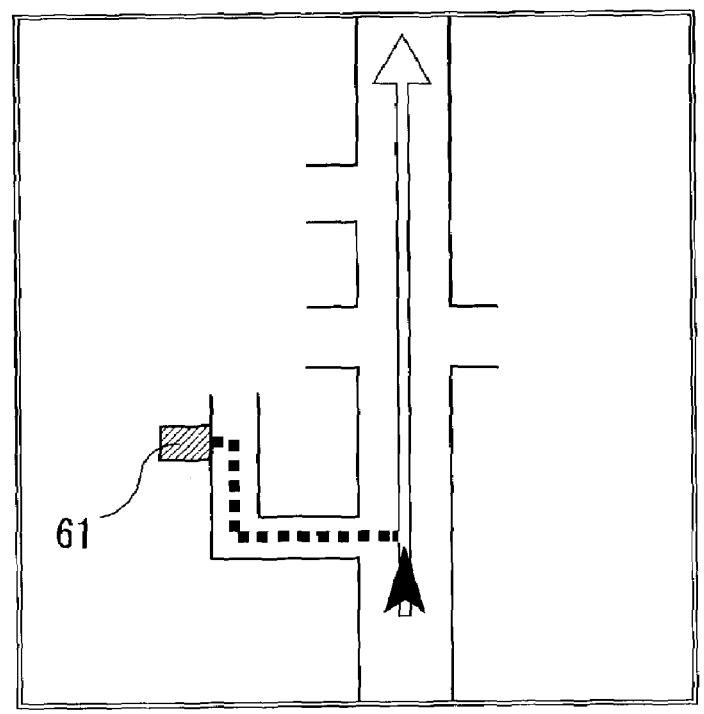

For example, as shown in FIG. 28A, if a shop 61 exists at a position in a predetermined vicinity area from the current position while the user is driving on the moving route set to the destination, only the least data necessary for driving and the navigation route to the shop are displayed. That is, if a shop 61 which is opened to a group or for which the user is a point member exists in the map area of the screen displayed on the navigator display 27 of the mobile navigator 4 as a vicinity area, a processing is performed as follows. A moving route and a navigation route from the current position to the shop 61 are displayed, as shown in FIG. 28B. Map data concerning the other roads and spot data concerning buildings and the like are not displayed (or hidden). Note that, as shown in FIG. 28B, an estimated route to the shop 61 may be displayed (as denoted by a dotted arrow in the figure).

As a result of thus not displaying other data than the least data necessary for driving, as in the above navigation to the shop 61 which is opened to a group or for which the user is a point member, the shop 61 displayed appears more clearly so that the advertisement effectiveness further increases.

In a case that there are plural shops 61 for each of which the user is a point member, the processing may be arranged such that the shops 61 are displayed as different icons respectively corresponding to point scores for example. For example, suppose that converted system points of plural shops 61 for each of which the user is a point member differ from each other, as shown in FIG. 29. As shown in FIG. 30A, icons may be displayed such that the higher the point score, the larger the icon. Also in this case, the navigation processing is performed such that only the least data necessary for driving and the data concerning navigation to the shops are displayed, as shown in FIG. 30B.

Figure 31A:
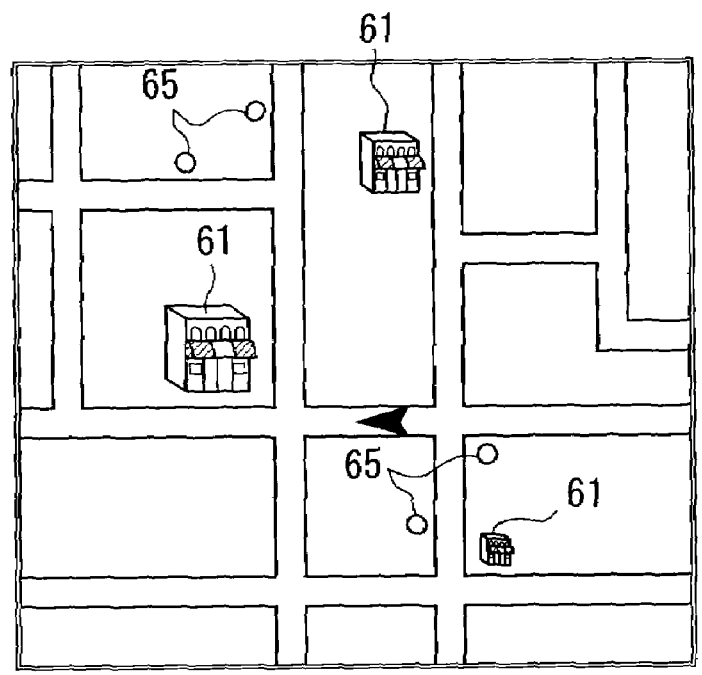
FIGS. 31A and 31B are explanatory views showing a display mode of guide navigation in which shop data is displayed in form of a map in the embodiment, where FIGS. 31A and 31B respectively show display states before and during guide navigation.
Figure 31B:
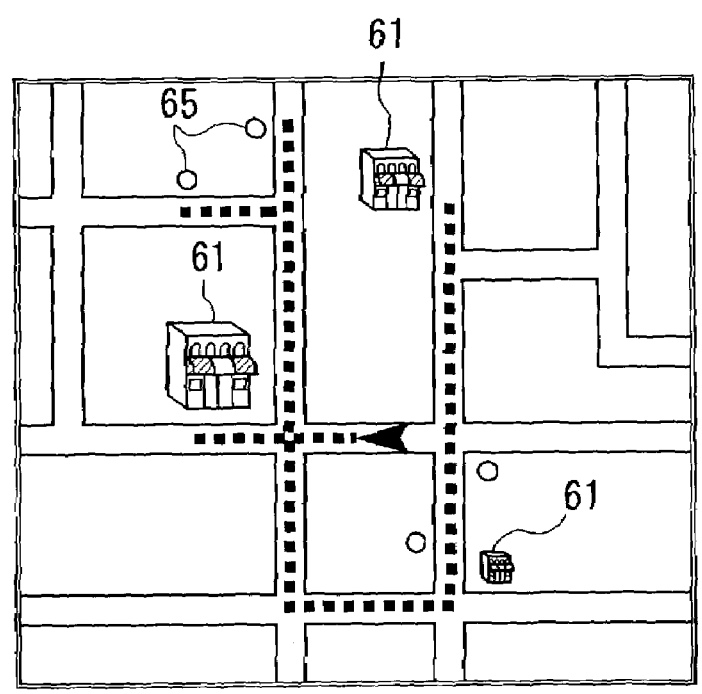
Figure 32:
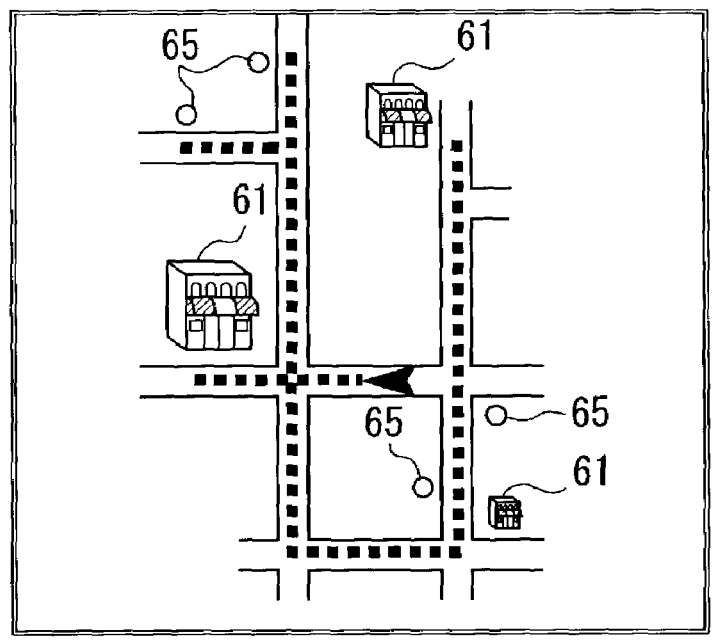
FIG. 32 is an explanatory view showing a display mode of guide navigation in which shop data is displayed in form of a map in the embodiment.
Figure 33:
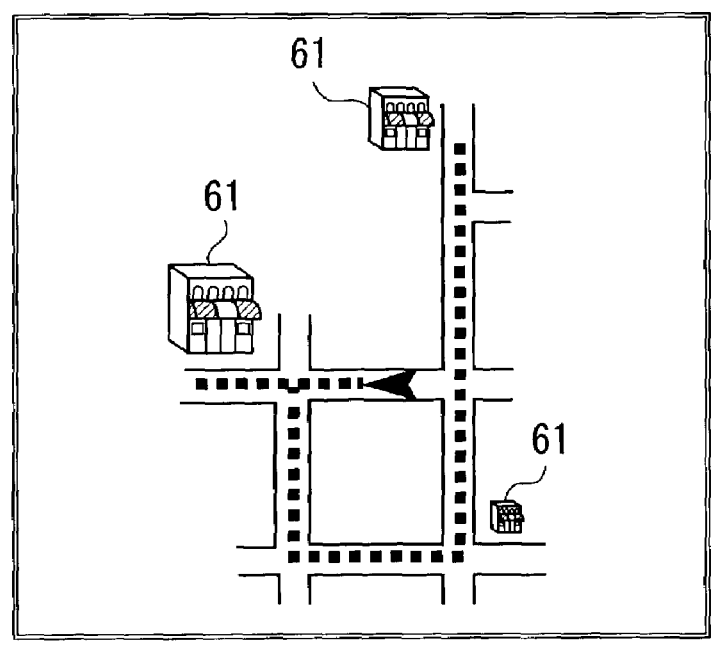
FIG. 33 is an explanatory view showing a display mode of guide navigation in which shop data is displayed in form of a map in the embodiment.

If the shops 61 for each of which the user is a point member and general advertisement client shops exist within a predetermined vicinity area from the current position, the processing is performed such that the shops 61 for each of which the user is a point member are displayed with more excellent visibility unlike the other advertisement client shops, as shown in FIG. 31A. With respect to navigation to the shops 61 and 65, guide navigation is carried out by displaying estimated routes as shown in FIG. 31B (denoted by a dotted arrow in the figure). Alternatively, as shown in FIG. 32, only the least data necessary for driving and the data necessary for navigation may be displayed. Further, as shown in FIG. 33, the processing may be performed so as to navigate the user only to the shops 61 for each of which the user is a point member or such that navigation to the shops 61 for each of which the user is a point member is displayed with more excellent visibility than the general advertisement client shops 65.

As a processing of navigation to the shops 61 for each of which the user is a point member or the shops opened to a group or the advertisement client shops, a processing of rerouting (or resetting) an estimated route for navigation if the vehicle 20 comes out of the estimated route as shown in FIG. 34. Specifically, if the vehicle 20 is not driven along an estimated route but comes out of the estimated route, as shown in FIG. 34A, the processing may be arranged as follows. As shown in FIG. 34B, the driving direction of the vehicle 20 is recognized, and a different estimated route is set in the driving direction. If the vehicle 20 further comes out of the different estimated route, as shown in FIGS. 34C and 34D, the estimated route is rerouted repeatedly and the navigation is retried repeatedly until the vehicle 20 finally makes a U-turn.

Figure 35D:
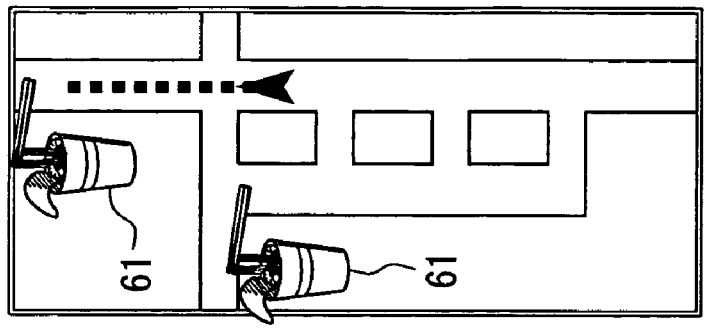
FIGS. 35A to 35D are explanatory views showing a display mode of guide navigation in which shop data is displayed in form of a map in the embodiment, where
Figure 35C:
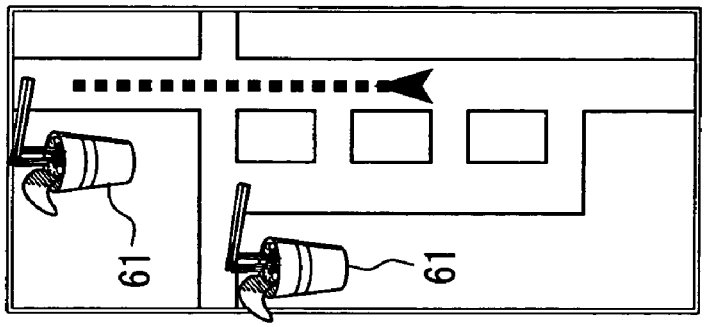
Figure 35B:
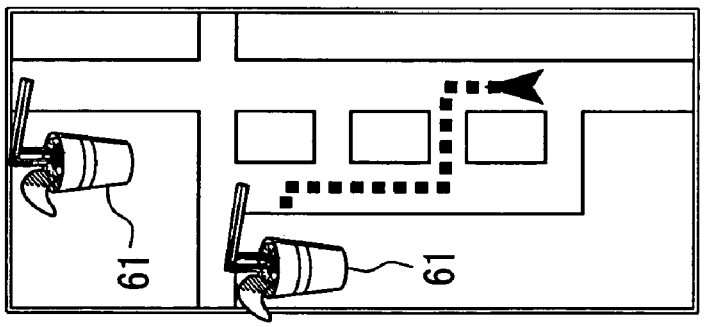
Figure 35A:
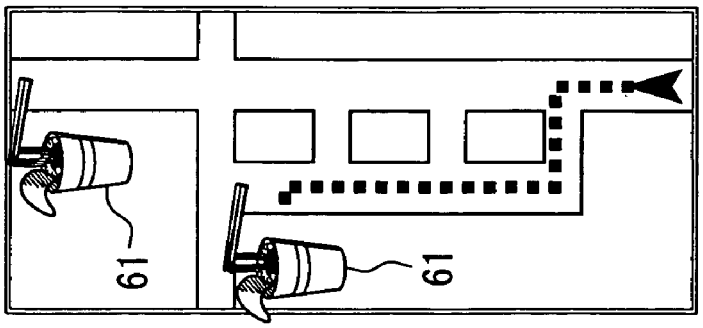

Further, the processing of navigation may execute rerouting for plural navigations if the vicinity area includes shops 61 for each of which the user is a point member, plural shops opened to a group, or plural advertisement client shops other than shops according to general spot data. To make further rerouting, a processing of attempting navigations to other shops may be carried out. For example, as shown in FIG. 35A, if two shops 61 exist along the driving direction, an estimated route for the navigation to the closest shop is set. If the vehicle 20 comes out of the estimated route, the driving direction of the vehicle 20 is recognized and another estimated route is set, as shown in FIG. 35B. Further, if the vehicle 20 comes out of the another estimated route, further another estimated route for navigation to the other shop 61 existing in the forward side in the driving direction is set to attempt to the other shop 61.

The processing of navigation may set such an estimated route that does not navigate the user to a general shop 66, if a predetermined vicinity area from the current position includes both of a general shop according to general spot data (for which navigation is not needed or desired), and a shop 61 for which the user is a point member or which is opened to a group, or an advertisement client shop. For example, a processing of inhibiting (hindering) display of the icon of the general shop 66 for which navigation is not desired, as shown in FIG. 36A. Alternatively, a processing of setting an estimated route to the shop 61 for which navigation is desired even though the general 66 is closer to the vehicle, as shown in FIGS. 36A, 36B, and 36C. This kind of processing is particularly effective if the shop 61 for which navigation is desired and the general shop 66 for which navigation is not desired are in the same business field or are competitive shops. Accordingly, the advertisement effectiveness is much more increased.

The processing of navigation may set an estimated route in accordance with point scores if there are plural shops 61 for each of which the user is a point member. Specifically, if the plural shops 61 have equal system point scores, plural estimated routes are set, and one estimated route is determined by an input operation from the navigator operator 26, as shown in FIG. 37A. Based on the determined estimated route, the processing of navigation is executed. Alternatively, if the system point scores differ among the shops 61, a processing of setting an estimated route which actively navigates the user to one of the shops 61 which has greater system point scores, as shown in FIGS. 37B and 37C. Inversely, the estimated route may be set to pass through the other shop 61 which has smaller system point scores.

The settings of the estimated route described above are not limited to the case that the processing is carried out by the navigator controller 29 of the mobile navigator 4. For example, the processing may be executed by the system controller 42 of the server 5. A processing result thereof may be received by the mobile navigator 4 via a wireless medium 32, and displayed on the navigator display 27.

The processing shown in the flowchart in FIG. 27 increases opportunities to navigate users to shops 61 whose shop data is stored, so that greater advertisement effectiveness can be expected. In particular, since shops 61 relevant to the purpose in moving are searched for, the advertisement effectiveness can be increased much more. Further, as a search result, the shops 61 are displayed in a display mode with higher visibility than other shops, so that the advertisement effectiveness can be increased furthermore.

In addition, the application to the mobile navigator 4 allows the user to easily set a moving route including side-trip points in advance, so that conveniences for the user can be improved. In case of searching for shops based on the current position while moving, the user is not guided before the user reaches the vicinity of a shop 61 to which the user desires to make a side trip. A problem may hence arise in that the moving route must be rapidly changed. However, if the shop 61 relevant to the purpose of the moving is searched for in advance, the user can move with composure.

(Handling Fee Collection Operation Based on Guide Navigation)

Figure 38:
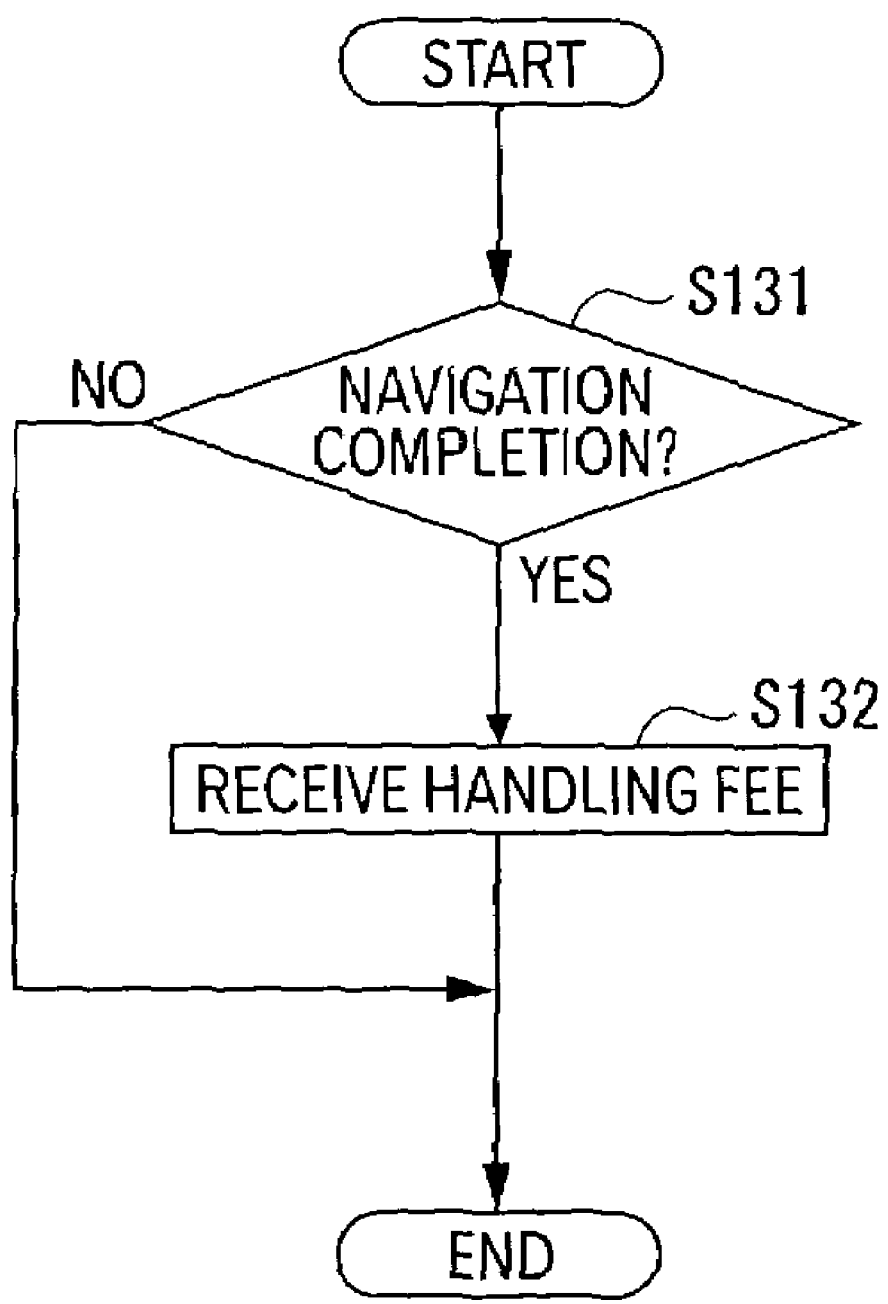
FIG. 38 is a flowchart showing an operation of receiving a handling fee when guide navigation is carried out to a shop in the embodiment.

Operation of collecting a handling fee based on guide navigation from an advertisement client shop to which the guide navigation is carried out as shown in FIG. 27 will now be described with reference to the drawings. FIG. 38 is a flowchart showing an operation of collecting a handling fee based on guide navigation.

First, if data processing is executed for guide navigation to a shop 61 for which the user is a point member, a shop 65 opened to a group, or an advertisement client shop as shown in the flowchart in FIG. 27, and then the data processing operation ends. It is determined whether the guide navigation to the shop 61 to which the navigation is to be made has been completed or not (step S131).

Figure 39:
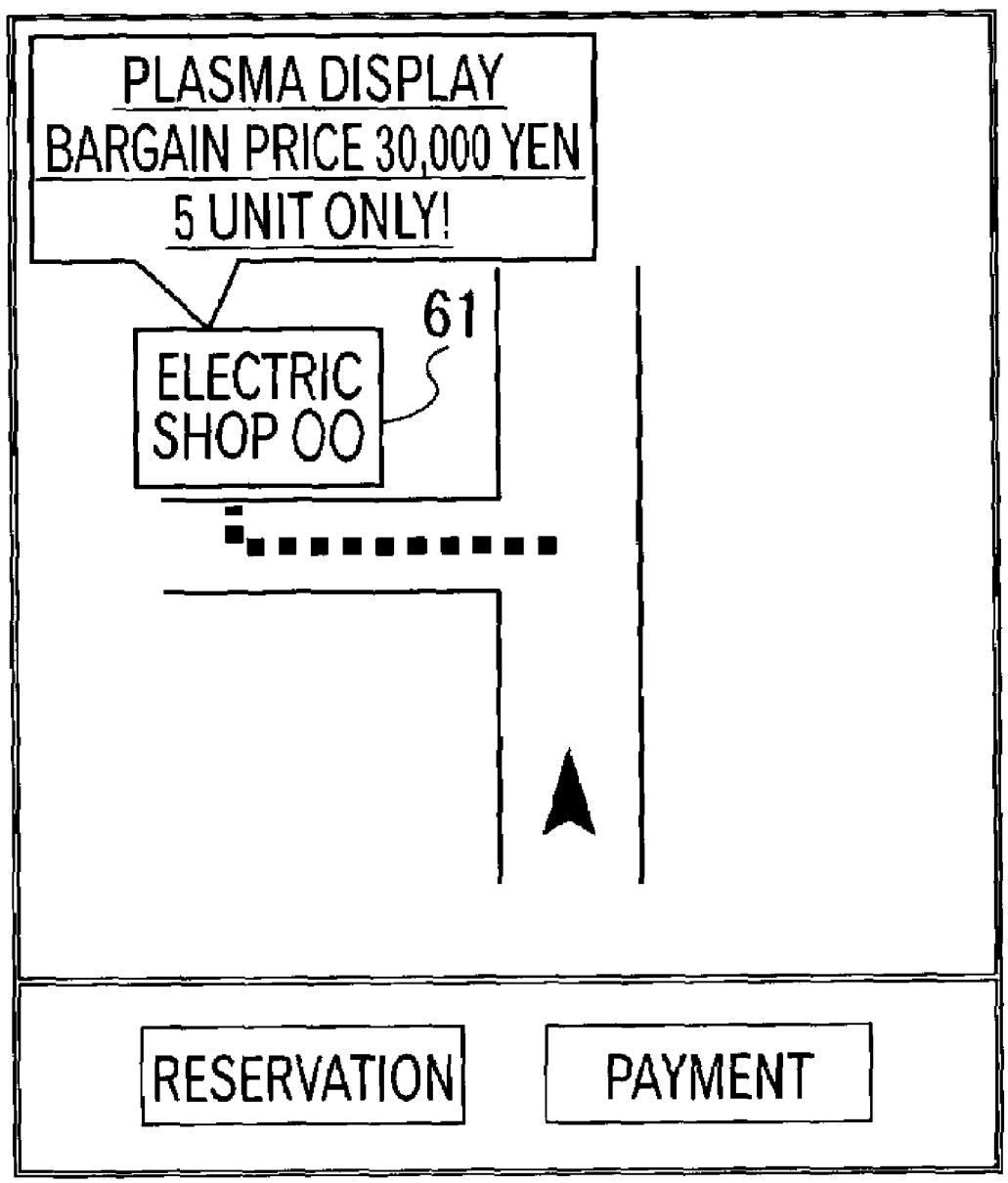
FIG. 39 is an explanatory view showing a display mode when notifying completion of navigation to a shop in the embodiment.

The completion of guide navigation in step S131, for example, is recognized as the server 5 recognizes a signal transmitted from the mobile navigator 4 when a reservation, order, or previous payment is made for a commercial item to purchase by operating the navigator operator 26 of the mobile navigator 4, a signal transmitted from a terminal computer of the shop 61 and notifying a completion of the reservation, order, or payment for a commercial product recognized by the shop 61, or a signal transmitted from an organization which manages the IC card used for a payment and notifying completion of the payment. As a concrete example, the reservation or payment is set and inputted by operating a touch panel on the navigator display 27 of the mobile navigator 4 or the navigator operator 26, as shown in FIG. 39. This input is recognized by the navigator controller 29, and the server 5 is then let output a signal notifying the completion of the navigation.

Otherwise, the completion of the guide navigation may be recognized as the server 5 recognizes arrival at the shop 61, from position data based on various sensor data of the mobile navigator 4. Further, the completion of the guide navigation may be recognized by an input from an input portion of the server 5 upon a contact from the shop 61 by telephone.

The server 5 thus recognizes the completion of guide navigation in step S131. Then, the server 5 executes a processing for attaining a predetermined handling fee from the shop 61. For example, the server 5 executes a processing of sending a bill or taking a procedure of charging the handling fee from a predetermined financial organization, or executes a processing of displaying a suggestion inviting a manager of the data processing system 1 to carry out such a processing or procedure (step S132). The processing then ends.

Note that handling fees may be applied to the case of navigation only and the case of actual payment and may also be set depending on the number of users navigated to shops 61 or depending on amounts of payments from users. If handling fees should depend on the number of navigated users, the handling fees may be set based on signals received by the server 5, such as a signal set and inputted from the mobile navigator 4, a signal expressing the number of automatically detected users by the number of customers detection sensor installed in the shop 61, a signal expressing an amount and outputted from a terminal at the payment, and the like.

Thus, in the processing operation shown in FIG. 38, not only relevant shops 61 are reported but also shops 61 to which aggressive navigation is carried out are reported. Therefore, advertisement performance increases greatly, so that great advertisement effectiveness can be expected. In addition, a new service of collecting handling fees therefrom can be achieved.

That is, in contrast to conventional advertisements merely presented on homepages, the present system is configured such that handling fees are charged for the results of actual navigation. Therefore, advertisement performance is very high, and the efficiency in sales is improved. Enhancement of use can be expected with ease.

Advantages of the Data Processing System

As has been described above, in the data processing system 1 according to the above embodiment, shops existing in a predetermined area are searched for based on position data which specifies positions of shops, of shop data specific to obtained shops. Based on use data concerning use frequency at which an obtained user used shops, the system 1 outputs a signal for displaying the searched shops on the terminal display of the terminal 3 or the navigator display 27 of the mobile navigator 4, in different display modes respectively corresponding to the use frequency of the searched shops. Therefore, desired shops can be excellently searched for in correspondence with the use frequency of the user, so that the user uses the searched shops at a higher rate, increased advertisement effectiveness can be attained for shops. As a result, the user can be excellently navigated to the searched shops. Further, from the increased advertisement effectiveness, steadier increase in use frequency of the user can be expected in comparison with the conventional advertisements which are merely presented on sites at predetermined costs. Thus, cost effectiveness in advertisement performance increases so that use can be enhanced.

Further, point data concerning points given to a user from a shop 61 is taken as use data concerning the use frequency of the shop 61, point management can be easily carried out by the user. In addition, the shop 61 can be easily searched for by a simple configuration which depends on, for example, whether the points are high or low. As a result, the processing efficiency can be improved. Further, various points are converted into system points expressed in common unit rates, so that more excellent shop searches can be achieved.

In addition, selection data indicating that the user has selected a shop 61, for example, as a shop 61 to be opened to a group by an input operation of the user is linked with shop data. Based on the selection data of shop data, the shop 61 is displayed with a different visibility. Therefore, the display mode of the shop 61 is set by the personal selection of the user. Handling of shop data for the user can thus be improved, so that convenience in searching for shops for the user and applicability of shop search results to general purposes can be improved.

Further, any searched shop 61 is displayed on map data. The searched shop 61 can therefore be checked on the map, so that the position of the shop 61 can be easily recognized with improved conveniences. In particular, an estimated route to the searched shop 61 from the current position is searched for, and the estimated route is displayed with higher visibility than other displayed map data. That is, only the least data necessary for moving and the data for navigation are displayed. As a result, efficiency in navigating the user to the shop 61 increases, so great advertisement effectiveness can be attained.

By listing searched shops on the display, even plural shops 61 can be easily compared with each other, improving conveniences.

The number of shops 61 to be displayed is set to a predetermined number. Therefore, sight cannot be prevented from deterioration even when a large number of shops are searched for. As a result, position check on a map in the map mode and comparison and evaluation in the list mode cannot be hindered. Accordingly, excellent shop search results can be attained.

If the number of shops to be displayed is greater than a preset number. Shops are displayed randomly, i.e., in the random display mode. It is accordingly possible to prevent a situation that no shops are displayed even though the number of shops to search for is limited and a search is carried out for every search. Hence, opportunities to allow the user to know new shops can be increased, so the advertisement effectiveness can be ensured.

Further, based on type data of shops in shop data, searched shops can be displayed for every type. Therefore, the search for the shop desired from the user can be much easier, improving conveniences.

In addition, when the user makes an input operation (which means a click) on an icon of "Side Trip", point data concerning points given to the user from a shop 61 and shop code data are attained as shop data by the shop data attaining portion of the system controller 42 of the server 5. In response to a disclosure request from the user of the terminal 3, controls are made to specify the position of the shop 61 based on shop position data and map data MP by the shop position specify portion of the system controller 42 of the server 5, and to output shop data by displaying the shop data on the terminal display 14 of the terminal 3 or the like. Therefore, where the shops 61 for each of which the user is a point member are and how many point scores the user has, can be easily recognized by using customer data of the user created by the registration-site server 6, in which users register themselves as point members, for example, at shops 61 or a point card registration-site through a registration procedure. Thus, shop data of shops 61 for each of which the user is a point member can be easily managed. Since management of shop data is easy for users, overlapped registrations of each user can be prevented and customer data to be stored can be efficiently reduced to a minimum. As a result, customer data can be easily managed at the shops 61, and the advertisement effectiveness is increased. Improvements can hence be expected in business results.

In addition, the registration-site server 6 creates customer data, by linking data concerning requirements including personal data specific to each user, with point data of the user. When a user makes an input operation on an icon of "Side trip" on the point card registration-site, point data and shop identification data of a corresponding shop 61 are outputted to the server 5. Therefore, shop data can be automatically created by the server 5 if the user only operates the icon of the "Side trip" together with the input operation for point card registration. Shop data can be easily created and managed in order to facilitate management of points given from the shop 61.

The server 5 is connected to the registration-site server 6 via the network 2, enabling transmission and reception therebetween. Therefore, shops 61 handle customer data processed in the registration-site server 6, independently from users. Users can also deal with the shop data processed in the server 5, from a terminal 3 or mobile navigator 4 independently from shops. Data processing corresponding to different purposes and different handlings can be easily attained, and rapid handling of data based on construction of the network 2 is easy. Use can thus be enhanced.

The icon of "Side trip" is provided in the point card registration-site of the registration-site server 6. By operating the icon, data is outputted to the server 5 for creating and managing shop data used by users. Thus, in the simple configuration of providing the icon, for example, the point card registration-site for omitting input operations from shops 61 is used to automatically create shop data easily. It is accordingly possible to achieve data management easily by users and shops 61 and increase in advertisement effectiveness.

Further, in response to a shop data disclosure request based on an input operation of a user from a terminal 3, controls are made such that shop data concerning a shop 61 specified on the basis of position data and map data MP is outputted to the user and displayed, for example, on the terminal display 14 of the terminal 3. Therefore, the position of the shop 61 is specified from the position data of the shop 61, for example, by an input operation of the user. Points of the shop 61 can be recognized from the point data of the shop data. The user can easily recognize data concerning the shop 61 by the input operation for the disclosure request. As a result, effective use of shop data can be progressed, and increase in advertisement effectiveness can be easily achieved.

In the shop data managed by the server 5, points given from respective shops 61 are converted into system points in common unit rates by the point conversion portion of the system controller 42. In this way, even when there are plural shops 61 for each of which the user is a point member, points can be converted into common unit rates, so points can be easily compared among the shops 61. As a result, recognition and management of data concerning shops 61 can be easily achieved.

When the shop use recognition portion of the system controller 42 recognizes a use of a shop by a user, the navigation fee charge portion of the system controller 42 outputs a guide which invites payment of a handling fee, to the shop 61 to which the user is navigated. Therefore, management of shop data is easy for the user, and great advertisement effectiveness can be attained. Accordingly, a procedure of charging a handling fee for advertisement performance used by the user can be automatically carried out as the user uses the shop 61. Data processing management can thus be easily achieved.

When group attribute data specific to a group linked to personal data inputted from a terminal 3 is attained, group identification data corresponding to the group attribute data is created and outputted to the terminal 3, and the group attribute data and the group identification data are stored as group data. Further, when the group attribute data and group identification data are inputted from the terminal 3, whether the data are authenticated or not is determined. If the data are determined to be authenticated, report data linked to the group attribute data is rendered readable for the terminal 3. Therefore, data concerning a favorite shop 61 can be shared between limited friends, for example. The favorite shop 61 can be used as if it is a hiding place or the like. Differentiated management and disclosure of data can thus be achieved easily.

Only in case where group attribute data different from stored group attribute data is recognized, group identification data is created in correspondence with the attained group attribute data, and a new group is registered. In this way, report data can linked to plural different groups and can be shared among the groups. Thus, improvements in applicability to general purposes and conveniences can be achieved.

Further, since a predetermined setting input from a terminal 3 can be recognized, group attribute data and group identification data together with guide data which invites participation in a group can be outputted to a predetermined terminal 3, for example, for friends with whom report data is desired to be shared. It is therefore unnecessary to distribute separately a guide, and services are easy. As a result, management of groups to share differentially report data within each group can be achieved easily.

Based on an input (step S71) determining participation from a terminal 3, a user ID and personal password which is personal data inputted when the determination is inputted and which authenticates a system member are linked to group data corresponding to a group in which the system member participates and stored as new group data into the group list table 52 in the storage 43. Therefore, when a new member participates in a group, the processing for sharing shop data as report data is automatically updated, so that no separate input processing is necessitated. The processing of sharing shop data only within a specific group can be easily achieved. Accordingly, the system management can be facilitated.

As data to be processed by the data processing system 1, there is shop data including location data specified by map data MP stored in the map data database 47. Therefore, all shop data which is stored in the shop table 53 and is differentially shared only within a predetermined group has the location data specified on the basis of the map data MP. Accordingly, shop data can be easily grasped and used and need not include map data MP. It is only necessary to link map data MP with location data of shop data. Thus, handling is facilitated and loads to the shop table 53 storing shop data can be reduced.

Further, only one data processing system 1 can manage the point card registration processing and the configuration of sharing data concerning shops 61 for which registration has bee made and the like within a predetermined group. Accordingly, the system configuration can be simplified and the processing efficiency can be improved.

In the management of data concerning points which has a characteristic similar to personal data, the registration-site server 6 manages shops 61, and the shop data related to the shops 61 can be linked and disclosed only within a group by the server 5. Therefore, data processing can be simplified, and the processing efficiency can be improved.

Due to the configuration in which an icon of "Side trip" to link with a site of the present data processing system 1 is provided in the point card registration-site, point card registration and data processing for opening shop data only to a predetermined group can be carried out in series. Accordingly, the operation ability can be improved, and conveniences can also be improved.

By clicking the icon of the "Side trip", the registration-site server 6 and the server 5 of the data processing system 1 are connected to each other. Point data and shop data can then be linked with map data MP of the data processing system 1 and can be dealt with as map data for users themselves. Therefore, shop data and point data can be widely used, and conveniences can be improved.

As a processing of shop data opened only within a group, use is available as an item of data for guide navigation to a destination. As a result, added value as a navigation system is given, so conveniences in use and advertisement performance can be improved.

Since the data processing system 1 is constructed by connecting the server 5 to the terminal 3 and the registration-site server 6 via the network 2, data communication can be easily achieved including management of shop data, management of points, setting of conditions in disclosing differentially shop data, acquisition of shop data from other members, and the like. As a result, conveniences in use can be improved and use can be enhanced easily.

Modifications of Embodiment

The present invention is not limited to the embodiment described above but may include modifications below within the scope that achieves the objects of the present invention.

Specifically, the data to be processed has been explained to be concerning shops 61. However, the data to be processed may be data concerning about outdoor activities including fishing or camps, or any data such as season data, like event data concerning festivals, astronomical observation data or scoop data. The data to be processed thus can be any data as long as the data can be shared within a group created. Like the case of the shops 61 described above, map data MP can be used for all data that is added with location data. Therefore, it is preferable for simplification of configuration, improvement in processing efficiency, and advertisement performance that the configuration of processing is arranged such that data processed on the basis of specific data such as astronomical data possessed by an astronomical observatory and the like or weather data possessed by a meteorological agency and the like can be shared only in each group.

In addition, the configuration is not limited to the configuration of opening data only to groups but any configuration may be adopted as far as the configuration is capable of efficient navigation to cooperating shops. In particular, it is possible to adopt not only the case where shops 61 for each of which a user is member are displayed by priority but also any configurations such as voice guides and displays in which more aggressive navigation is carried out in accordance with increase in advertisement handling fees.

Further, the registration method for using the present data processing system 1 is not limited to a so-called online registration method as shown in FIG. 9 but may be another method as follows. For example, an applicant for use may mail a written card or connect by telephone to inform the manager of the data processing system 1 of requirements. The manager directly register the applicant in the server 5.

The data processing for participation of a member in a group has been described with reference to the configuration in which any of organizers or members of a group can distribute a guide for participation in the group, as shown in FIG. 11. However, in distributing the guide in step S53 shown in FIG. 11, whether a guide may be distributed or not may be confirmed to the organizer of the group. Only in the case where an admission is attained, the guide may be distributed. Alternatively, the configuration may be arranged such that a predetermined password or the like which is given only to a group organizer can be attained when creating a new group. In place of the determination made in step S48 shown in FIG. 11 about whether an accessing person is a group member or not, it is possible to use an operation of confirming whether an accessing person is a group organizer or not, so that only group organizers can distribute a guide for participation of a new member.

Further, a description has been made with respect to the configuration in which notifying participation of a new member is notified to members in series of operations when a new member participates in a group. However, it is possible to adopt a processing of distributing the notification separately in accordance with a request from the new member or an organizer.

Further, a configuration in which data can be simply shared in a created group may be adopted, without providing the processing of point card registration as shown in FIGS. 14 and 15, the vicinity search processing shown in FIG. 16, the shop search processing shown in FIG. 27, or the handling fee charge processing shown in FIG. 38.

The configuration of transmitting/receiving data via the network 2 has been described above. However, the system can be configured not only by the Internet but also, for example, by personal computers connected by cables, like a LAN (Local Area Network).

Further, the mobile navigator 4 and terminal 3 are not essential components for the data processing system 1. It is possible to connect any terminals that can use data subjected to processing by the system, such as creation of a group to share data, disclosure of data, and the like.

The server 5 and the registration-site server 6 for point card registration processing have been explained to be separate from each other. However, the configuration may be arranged such that the server 5 executes the processing of point card registration. According to this configuration, data such as personal data need not be stored, overlapped in both of the servers 5 and 6. Therefore, the configuration can be more simplified and the processing efficiency can be improved more.

The processing described above may be supplied in form of an apparatus in which a program to be executed by a computer is installed or in form of a recording medium which records the program and also a program for reading the program and operating a computer to execute the program. In this kind of configuration, computers for general purposes can be used to enhance use of the system.

Respective processing have been respectively explained with reference to individual operations. However, in case of sequentially executing the processing of distributing a guide for participation of a new member in a group after the processing of creating a new group, for example, processing may be executed from the step S51 of distributing the guide without executing authentication of membership of a system member after creating the new group. Thus, processing can be carried out so that overlapping processing can be omitted. According to this configuration, the processing efficiency and operation ability can be improved, so conveniences in use can be improved.

Further, in the processing shown in FIG. 12, the processing step S74 of notifying participation of a new member. Note that constraints on data shared among sharing members can be securely maintained participation of a new member.

Based on the flowchart shown in FIG. 12, explanation has been made with respect to the operation for participation of a new member. For example, a similar processing can be applied to the case of withdrawal from a group. Specifically, at the time when whether participation is intended or not is determined in step S71, whether withdrawal is intended or not may be confirmed. If the confirmation is transmitted to the server 5 (step S72), the server 5 may release a link of personal data from group data. To be specific, the record of an inputted member ID may be deleted (step S73). Also in this case, a guide notifying the withdrawal may be distributed to other members (step S74) or the distribution processing may be omitted.

Also, explanation has been made with respect to the configuration in which the mobile navigator 4 is mounted on a vehicle to support driving of the vehicle. However, application is available to guide a walker moving, for example, if the walker carries the navigator.

Also, explanation has been made of a configuration in which the navigator controller 29 is provided in the mobile navigator 4 and further mounted on a vehicle. However, the navigator controller 29 may be provided separately in the server 5. Data from various sensors mounted on the vehicle may be transmitted to the server 5 via a communication portion. The system controller 42 in the server 5 may execute processing concerning the current position, moving routes, vicinity search, shop search, or the like. Guides may then be displayed on the navigator display 27 or generated as voices from a voice generation portion such as a navigator audio conductor 28. In this case, components to be mounted on the vehicle are reduced so that lighter weight and smaller size can be easily achieved.

The configuration is arranged such that data is stored into the map data storage 25 of the mobile navigator 4 from the map data database 47 of the server 5 via the wireless medium 32. The map data storage 25 may be configured by using a driver that appropriately reads the map data MP stored in a recording medium. Note that, the map data MP is attained through communications in the above described embodiment, by arranging the map data MP, that has immense volumes of data, in the server 5, lighter weight and smaller size of the navigator 4 can be easily achieved.

The map data MP is not limited to the configuration using links L described above but may have any data form. For example, the map data MP may be configured by combining nodes with data indicating directions branched from the nodes.

The current position data attaining portion, moving route search portion, and displayable shop number setting portion are provided in the navigator controller 29 to execute processing. However, the configuration may be arranged such that these portion may be provided in the system controller 42 in the server 5, for example. Results processed by the server 5 may be simply displayed on the navigator display 27 or on the terminal display 14 of the terminal 3.

Furthermore, specific configurations and procedures in practicing the present invention can be appropriately modified into other configurations within the scope that achieves the objects of the present invention.

What is claimed is:

1. A navigator which navigates a user to a shop, comprising:
   a use data attaining portion which attains use data concerning use frequency at which the user used the shop;
   a shop data attaining portion which attains shop data specific to the shop, the shop data including position data specifying the position of the shop;
   a shop search portion which searches for the shop existing within a predetermined area, based on the position data of the shop data attained by the shop data attaining portion;
   a display controller which outputs a signal for making the actual shop display characteristic of the shop searched for by the shop search portion, be displayed in a display mode in which visibility of the actual shop display characteristic is differentiated from display characteristics of other shops based on the use data attained by the use data attaining portion, the visibility of the actual shop display characteristic becoming higher in correspondence with the use frequency; and
   a displayable shop number setting portion which sets the number of shops to be displayed by the display controller, to a predetermined number,
   wherein the display controller outputs a signal for making the shops to be displayed be displayed at random if the number of shops to be displayed is greater than the predetermined number set by the displayable shop number setting portion.

2. The navigator according to claim 1, wherein
   the use data attaining portion attains point data concerning points given to the user from the shop, as the use data concerning the use frequency of the shop.

3. The navigator according to claim 1, further comprising:
   a setting input recognition portion which recognizes an input operation for selection of a shop from a user; and
   a shop data processing portion which links selection data expressing the selection from the user, to shop data of the shop recognized through the input operation by the setting input recognition portion, wherein
   the display controller outputs a signal for making the shop be displayed with visibility which is differentiated based on selection data of the shop data.

4. The navigator according to claim 1, further comprising a map data storage which stores map data, wherein the display controller outputs a signal for making the shop be displayed on the map data.

5. The navigator according to claim 4, further comprising:
   a current position data attaining portion which attains current position data concerning a current position; and
   a moving route search portion which searches for an estimated route from the current position to the searched shop, based on the map data stored in the map data storage, and estimated from the current position data attained by the current position data attaining portion and the shop data of the searched shop searched for by the shop search portion, wherein
   the display controller outputs a signal for making the estimated route searched for by the moving route search portion be displayed with higher visibility than other data of the map data.

6. The navigator according to claim 1, wherein the display controller outputs a signal for making the shop be displayed in form of a list.

7. The navigator according to claim 1, wherein the shop data attaining portion attains shop data including type data of the shop, and the display controller outputs a signal for making shops searched for by the shop search portion be displayed for every type, based on the type data of the shop data.

8. A navigation system comprising:
   the navigator according to claim 1; and
   a terminal connected to the navigator, being capable of receiving at least the signal outputted from the display controller of the navigator, to display shops in a display mode in which visibility is differentiated in correspondence with use frequencies of the shops, based on the signal from the display controller.

9. The navigator as recited in claim 1, wherein said actual shop display characteristic and said display characteristics of other shops are icons in which the icons representing said actual shop display are made larger than the icons representing the display characteristics of other shops, colored differently, flickered, brighter, or with a sharper profile in correspondence with the use frequency.

10. A navigation method of using a computer to navigate a user to a shop, comprising steps of:
    attaining use data concerning a use frequency at which the user used the shop, and attaining shop data specific to the shop, the shop data including position data specifying the position of the shop;
    searching for the shop existing within a predetermined area, based on the position data of the attained shop data;
    making the actual shop display characteristic of the shop searched to be displayed in a display mode in which visibility of the actual shop display characteristic is differentiated from display characteristics of other shops based on the attained use data, the visibility of the actual shop display characteristic becoming higher in correspondence with the use frequency; and
    setting the number of shops to be displayed by a display controller to a predetermined number,
    wherein the display controller outputs a signal for making the shops to be displayed be displayed at random if the number of shops to be displayed is greater than the predetermined number that is set.

11. A navigation program stored on a computer readable medium by which a computer is made to execute the navigation method according to claim 10.

12. A computer readable recording medium on which the navigation program according to claim 11 is recorded.

13. The navigation method as recited in claim 10, wherein said actual shop display characteristic and said display characteristics of other shops are icons in which the icons representing said actual shop display are made larger than the icons representing the display characteristics of other shops, colored differently, flickered, brighter, or with a sharper profile in correspondence with the use frequency.

* * * * *